United States Patent
Li et al.

(10) Patent No.: US 12,418,942 B2
(45) Date of Patent: Sep. 16, 2025

(54) SCHEDULING A DATA PACKET BY USING RADIO NETWORK TEMPORARY IDENTIFIER

(71) Applicant: HUAWEI TECHNOLOGIES CO., LTD., Guangdong (CN)

(72) Inventors: Bingzhao Li, Beijing (CN); Lei Guan, Beijing (CN); Meng Li, Beijing (CN); Yanmei Yang, Beijing (CN); Wanqiang Zhang, Beijing (CN); Cuili Ge, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 485 days.

(21) Appl. No.: 17/568,097

(22) Filed: Jan. 4, 2022

(65) Prior Publication Data
US 2022/0124840 A1    Apr. 21, 2022

Related U.S. Application Data

(63) Continuation of application No. PCT/CN2020/105575, filed on Jul. 29, 2020.

(30) Foreign Application Priority Data

Jul. 31, 2019   (CN) .......................... 201910704742.5
Sep. 12, 2019   (CN) .......................... 201910866760.3

(51) Int. Cl.
*H04W 76/10*    (2018.01)
*H04W 4/06*    (2009.01)
(Continued)

(52) U.S. Cl.
CPC ............. *H04W 76/10* (2018.02); *H04W 4/06* (2013.01); *H04W 72/044* (2013.01); *H04W 72/1263* (2013.01)

(58) Field of Classification Search
CPC ............. H04W 72/1263; H04W 76/10; H04W 72/044; H04W 4/06; H04W 76/11
See application file for complete search history.

(56) References Cited

U.S. PATENT DOCUMENTS

2009/0239590 A1\*  9/2009  Parkvall ................ H04W 52/58
                                                              455/572
2016/0183226 A1    6/2016  Rapaport et al.
(Continued)

FOREIGN PATENT DOCUMENTS

CN    103491643 A    1/2014
CN    105900355 A    8/2016
(Continued)

OTHER PUBLICATIONS

Extended European Search Report issued in European Application No. 20846975.9 on Jun. 1, 2022, 8 pages.
(Continued)

*Primary Examiner* — Sulaiman Nooristany
(74) *Attorney, Agent, or Firm* — Fish & Richardson P.C.

(57) ABSTRACT

Embodiments of the present invention disclose a communication method and apparatus. an example method includes: setting up a first radio bearer for a first terminal device, where the first radio bearer is used to transmit a first service; allocating a first RNTI and a second RNTI to the first terminal device, where the first RNTI is used to schedule a service for the first terminal device, and the second RNTI is used to schedule the first service for a group of terminal devices including the first terminal device; and scheduling a data packet of the first service for the first terminal device on the first radio bearer by using the first RNTI and the second RNTI.

13 Claims, 12 Drawing Sheets

(51) Int. Cl.
*H04W 72/044* (2023.01)
*H04W 72/1263* (2023.01)

(56) References Cited

U.S. PATENT DOCUMENTS

2017/0347341 A1* 11/2017 Zhang .................... H04L 12/189
2018/0035405 A1* 2/2018 Fujishiro ............... H04W 72/30
2018/0049060 A1* 2/2018 Fujishiro ............... H04W 72/30
2018/0343694 A1 11/2018 Tomishige
2021/0068004 A1* 3/2021 Kadiri .................... H04L 47/15
2021/0185711 A1* 6/2021 Zhang .................... H04W 72/20

FOREIGN PATENT DOCUMENTS

CN 109429188 A 3/2019
CN 109982266 A 7/2019
WO 2016127772 A1 8/2016

OTHER PUBLICATIONS

PCT International Search Report and Written Opinion issued in International Application No. PCT/CN2020/105575 on Oct. 26, 2020, 12 pages (partial English translation).

* cited by examiner

SCHEDULING A DATA PACKET BY USING RADIO NETWORK TEMPORARY IDENTIFIER

CROSS-REFERENCE TO RELATED APPLICATIONS

This application is a continuation of International Application No. PCT/CN2020/105575, filed on Jul. 29, 2020, which claims priority to Chinese Patent Application No. 201910704742.5, filed on Jul. 31, 2019 and Chinese Patent Application No. 201910866760.3, filed on Sep. 12, 2019. All of the aforementioned patent applications are hereby incorporated by reference in their entireties.

TECHNICAL FIELD

Embodiments of the present invention relate to the field of communication technologies, and in particular, to a communication method and apparatus.

BACKGROUND

A multicast technology is a point-to-multipoint communication technology. Currently, when transmitting a multicast service, terminal devices in a same cell may perform transmission by using a same group radio network temporary identity (G-RNTI). However, when a received signal of a terminal device is poor, the terminal device needs to set up a unicast bearer, so that the service can be received by using the unicast bearer. Nevertheless, switching between multicast and unicast by the terminal device may be interrupted. Consequently, the terminal device cannot receive information. In this way, communication efficiency is reduced.

SUMMARY

Embodiments of the present invention disclose a communication method and apparatus, to improve communication efficiency.

According to a first aspect, a communication method is disclosed. A first radio bearer used to transmit a first service is set up for a first terminal device, a first radio network temporary identity (RNTI) and a second RNTI are allocated to the first terminal device, and a data packet of the first service is scheduled for the first terminal device on the first radio bearer by using the first RNTI and the second RNTI. The first RNTI is used to schedule a service for the first terminal device, and the second RNTI is used to schedule the first service for a group of terminal devices including the first terminal device. Because both an RNTI for scheduling a unicast service and an RNTI for scheduling a multicast service are allocated to a terminal device to schedule data from a same radio bearer, a radio bearer change is not caused when the terminal device switches between multicast and unicast, and therefore, no interruption is generated. In this way, communication efficiency can be improved.

In a possible implementation, a service setup request message from a core network device is received, and the service setup request message carries common information used to indicate that the first service is a multicast service. It can be learned that the service may be determined as the multicast service by using the common information, thereby improving service type determining efficiency.

In a possible implementation, the common information may be service information or may be address information of the multicast service.

In a possible implementation, the first radio bearer may be associated with a first common data channel, where the first common data channel is used to transmit the data of the first service with the core network device, so that when a plurality of terminal devices all receive the first service, the core network device may transmit the data of the first service by using the first common data channel, and does not need to separately set up dedicated data channels for different terminal devices. In this way, a same piece of data repeatedly sent on a plurality of dedicated data channels can be avoided.

In a possible implementation, the data packet of the first service may be scheduled for the first terminal device on the first radio bearer by using the second RNTI, feedback information that is from the first terminal device and that is used to indicate that the data packet of the first service fails to be transmitted is received, and the data packet of the first service is retransmitted to the first terminal device on the first radio bearer by using the first RNTI. Data may be newly transmitted by using the second RNTI, and data that fails to be transmitted is retransmitted by using the first RNTI. It can be learned that retransmission of the data that fails to be transmitted does not affect transmission of new data by using the second RNTI. In this way, communication efficiency is improved.

In a possible implementation, an association relationship between the first process and the second process may be sent to the first terminal device, where the first process is a process used to initially transmit the data packet of the first service, and the second process is a process used to retransmit the data packet of the first service. Data newly transmitted or retransmitted by using different RNTIs may be associated based on the association relationship, so that received data can be correctly processed. In this way, data processing efficiency can be improved.

In a possible implementation, indication information may be sent to the first terminal device, and the indication information may indicate that the second RNTI is used for scheduling the first service, so that the first terminal device can quickly determine a specific service that is transmitted by using the second RNTI.

In a possible implementation, the data packet of the first service may include a logical channel identifier, and the logical channel identifier is used to indicate that a data packet transmitted by using the second RNTI is the data packet of the first service. It can be learned that no additional information needs to be transmitted, and a service corresponding to a data packet can be determined by using only the data packet. In this way, resources can be saved.

In a possible implementation, first configuration information may be sent to the first terminal device, where the first configuration information is used to indicate the first terminal device to detect the second RNTI based on the first configuration information, so that the terminal device can quickly detect the second RNTI based on the configuration information. In this way, communication efficiency is improved.

In a possible implementation, the first configuration information may include one or more of bandwidth part (BWP) information corresponding to the second RNTI, control resource set (CORESET) information corresponding to the second RNTI, and search space information corresponding to the second RNTI.

In a possible implementation, indication information used to indicate a quantity of the terminal devices receiving the first service and/or configuration information of an RNTI used for the first service may be sent to a resource management module. Second configuration information that includes configuration information of the second RNTI and that corresponds to the first service is received from the resource management module. The second configuration information is sent to the first terminal device. It can be learned that, by using the resource management module, a terminal device that transmits the first service and that is in terminal devices corresponding to a plurality of cells or a plurality of access network devices may use a same RNTI or same second configuration information, so that a same resource is used for multicast transmission in an area. In this way, received signal quality is improved, and service interruption caused by mobility is reduced.

In a possible implementation, an association relationship from the core network device between the first terminal device and the data of the first service may be received. The first terminal device is any terminal device in the group of terminal devices. The association relationship may include at least one of the following: an association relationship between an identifier of a quality of service (QoS) flow of the first terminal device and an identifier of a common QoS flow, where the common QoS flow is used to transmit the data of the first service; an association relationship between an identifier of a QoS flow of the first terminal device and an identifier of a QoS flow of a second terminal device, where the QoS flow of the second terminal device is used to transmit the data of the first service, and the second terminal device is a terminal device other than the first terminal device in the group of terminal devices; and an association relationship between a QoS flow identifier of the first terminal device and index information of the data of the first service. It can be learned that terminal devices that receive the data of the first service may be determined based on the association relationship, so that a same second RNTI can be allocated to these terminal devices.

In a possible implementation, a session setup request message that is used to set up the QoS flow of the first terminal device and that is from the core network device is received. The session setup request message is used to indicate that the QoS flow of the first terminal device is used to carry data of the multicast service. It can be learned that a service carried by the QoS flow of the first terminal device may be determined as the multicast service based on the session setup request message, so that service type determining efficiency can be improved.

According to a second aspect, a communication apparatus is disclosed. The communication apparatus may set up, to an access network device, a first radio bearer used to transmit a first service, receive a first RNTI and a second RNTI from the access network device, and receive, on the first radio bearer by using the first RNTI and the second RNTI, a data packet that is of the first service and that is scheduled by the access network device. The first RNTI is used to receive a service scheduled by the access network device for a terminal device, and the second RNTI is used to receive the first service scheduled by the access network device for a group of terminal devices including the terminal device. Because both an RNTI for scheduling a unicast service and an RNTI for scheduling a multicast service can be used by a terminal device to receive a service from a same radio bearer, a radio bearer change is not caused when the terminal device switches between multicast and unicast, and therefore, no interruption is generated. In this way, communication efficiency can be improved.

In a possible implementation, the data packet that is of the first service and that is scheduled by the access network device may be received on the first radio bearer by using the second RNTI, feedback information used to indicate that the data packet of the first service fails to be transmitted is sent to the access network device, and the data packet that is of the first service and that is retransmitted by the access network device is received on the first radio bearer by using the first RNTI. Data may be newly transmitted by using the second RNTI, and data that fails to be transmitted is retransmitted by using the first RNTI. It can be learned that retransmission of the data that fails to be transmitted does not affect transmission of new data by using the second RNTI. In this way, communication efficiency is improved.

In a possible implementation, an association relationship between a first process and a second process from the access network device may be received, and the data packet that is of the first service and that is retransmitted by the access network device is received on the first radio bearer based on the association relationship by using the first RNTI. The first process is a process used to initially transmit the data packet of the first service, and the second process is a process used to retransmit the data packet of the first service. Data newly transmitted or retransmitted by using different RNTIs may be associated based on the association relationship, so that received data can be correctly processed. In this way, data processing efficiency can be improved.

In a possible implementation, the first indication information from the access network device may be received, and it is determined, based on the first indication information, that the second RNTI is used for scheduling the first service, so that the first terminal device can quickly determine a specific service that is transmitted by using the second RNTI.

In a possible implementation, it may be determined, based on a logical channel identifier included in the data packet of the first service, that a data packet transmitted by using the second RNTI is the data packet of the first service. It can be learned that no additional information needs to be transmitted, and a service corresponding to a data packet can be determined by using only the data packet. In this way, resources can be saved.

In a possible implementation, configuration information from the access network device may be received, and the data packet that is of the first service and that is from the access network device is detected on the first radio bearer based on the second RNTI and the configuration information, so that the terminal device can quickly detect the second RNTI based on the configuration information. In this way, communication efficiency can be improved.

In a possible implementation, the first configuration information may include one or more of BWP information corresponding to the second RNTI, CORESET information corresponding to the second RNTI, and search space information corresponding to the second RNTI.

In a possible implementation, second indication information from the access network device may be received, and it is determined, based on the second indication information, that the first radio bearer is a radio bearer used to transmit the first service, so that the terminal device may quickly determine, based on the second indication information, a specific service that a service transmitted by using the first radio bearer is. In this way, communication efficiency can be improved.

In a possible implementation, a first data packet that is of the first service and that is from the access network device can be received by using the first RNTI. A second data packet that is of the first service and that is from the access network device can be received by using the second RNTI. The first data packet and the second data packet are then combined onto the first radio bearer. It can be learned that, different data packets of a same service may be jointly transmitted by using the first RNTI and the second RNTI, and then combined, so that data transmission efficiency can be improved.

In a possible implementation, when the first data packet and the second data packet are data packets at a media access control (MAC) MAC layer, radio link control (RLC) protocol data units (PDUs) included in the first data packet and the second data packet may be combined onto the first radio bearer at an RLC layer; or when the first data packet and the second data packet are data packets at an RLC layer, packet data convergence protocol (PDCP) PDUs included in the first data packet and the second data packet may be combined onto the first radio bearer at a PDCP layer.

In a possible implementation, the RLC PDU included in the first data packet and the RLC PDU included in the second data packet may be sorted and/or deduplicated.

In a possible implementation, the PDCP PDU included in the first data and the PDCP PDU included in the second data packet may be sorted and/or deduplicated.

According to a third aspect, a communication apparatus is disclosed. The communication apparatus includes modules configured to perform the communication method disclosed in any one of the first aspect or the implementations of the first aspect, or includes modules configured to perform the communication method disclosed in any one of the second aspect or the implementations of the second aspect.

According to a fourth aspect, a communication apparatus is disclosed. The communication apparatus may be an access network device or a chip in the access network device. The communication apparatus includes a processor, a memory, an input interface, and an output interface. The input interface is configured to receive information from a communication apparatus other than the communication apparatus, and the output interface is configured to output information to a communication apparatus other than the communication apparatus. When the processor executes a computer program stored in the memory, the processor is enabled to perform the communication method disclosed in any one of the first aspect or the possible implementations of the first aspect.

According to a fifth aspect, a communication apparatus is disclosed. The communication apparatus may be a terminal device or a chip in the terminal device. The communication apparatus includes a processor, a memory, an input interface, and an output interface. The input interface is configured to receive information from a communication apparatus other than the communication apparatus, and the output interface is configured to output information to a communication apparatus other than the communication apparatus. When the processor executes a computer program stored in the memory, the processor is enabled to perform the communication method disclosed in any one of the second aspect or the possible implementations of the second aspect.

According to a sixth aspect, a computer-readable storage medium is disclosed. The computer-readable storage medium stores a computer program. When the computer program runs, the communication method disclosed in any one of the first aspect or the implementations of the first aspect is implemented, or the communication method disclosed in any one of the second aspect or the implementations of the second aspect is implemented.

DESCRIPTION OF EMBODIMENTS

Embodiments of the present invention disclose a communication method and apparatus, to improve communication efficiency. Details are separately described below.

Figure 1:
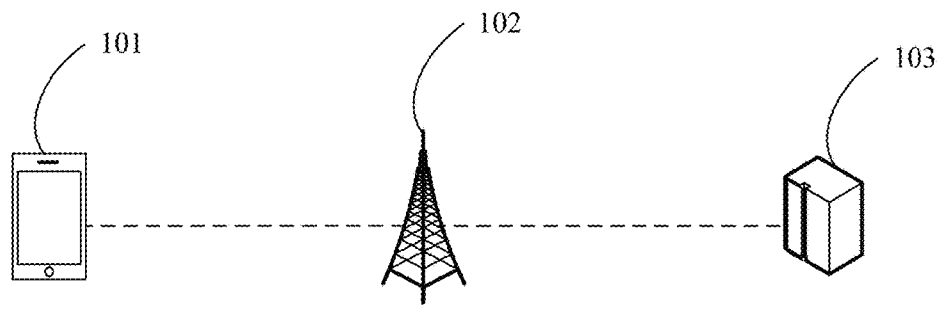
FIG. 1 is a schematic diagram of a network architecture according to an embodiment of the present invention.

To better understand the communication method and apparatus according to the embodiments of the present invention, the following first describes a network architecture used in the embodiments of the present invention. FIG. 1 is a schematic diagram of a network architecture according to an embodiment of the present invention. As shown in FIG. 1, the network architecture may include a terminal device 101, an access network device 102, and a core network device 103. The terminal device 101 and the access network device 102, and the access network device 102 and the core network device 103 may be connected through a network. The core network device 103 is configured to: send information to the access network device 102, and receive information from the access network device 102. The access network device 102 is configured to: send information to the terminal device 101 and the core network device 103, and receive information from the terminal device 101 and the core network device 103. The terminal device 101 is configured to: send information to the access network device 102, and receive information from the access network device 102.

The terminal device 101 may be user equipment (UE), an access terminal, a subscriber unit, a subscriber station, a mobile station, a remote station, a remote terminal, a mobile device, a user terminal, a wireless communication device, a user agent, or a user apparatus. The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal in a future 5G network, a terminal in a future evolved public land mobile network (PLMN), or the like.

The access network device 102 may be a device configured to communicate with the terminal device 101. The access network device 102 may be a base transceiver station (BTS) in a global system for mobile communications (GSM) or a code division multiple access (CDMA) system, may be a NodeB (NB) in a wideband code division multiple access (WCDMA) system, may be an evolved NodeB (eNB or eNodeB) in a long term evolution (LTE) system, may be a terminal that functions as an access network device in device-to-device (D2D) communication, may be a relay station, an access point, a vehicle-mounted device, a transmission point, a wearable device, a network side device in a future 5G network, an access network device in a future evolved PLMN, or any device that functions as a network.

The core network device 103 in different systems may correspond to different devices. For example, the core network device 103 may correspond to a serving general packet radio service (GPRS) support node (serving GPRS support node, SGSN) and/or a gateway GPRS support node (GGSN) in 3G, may correspond to a mobility management entity (MME) and/or a serving gateway (S-GW) in 4G, or may correspond to an access and mobility management function (AMF), a session management function (SMF), or a user plane function (UPF) in 5G.

Figure 2:
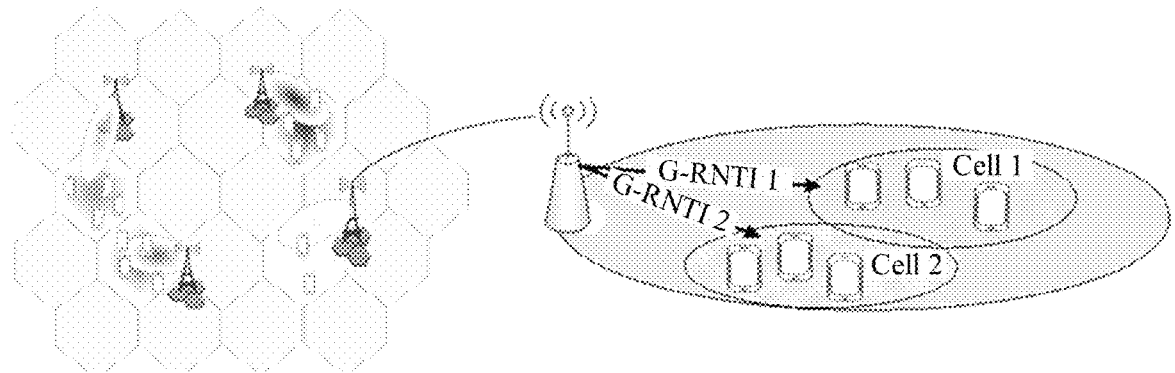
FIG. 2 is a schematic diagram of implementing multicast transmission by using SC-PTM according to an embodiment of the present invention.

To better understand the communication method and apparatus according to the embodiments of the present invention, the following first describes an application scenario used in the embodiments of the present invention. Single cell point to multipoint (SC-PTM) is a technology for implementing multicast transmission. FIG. 2 is a schematic diagram of implementing multicast transmission by using SC-PTM according to an embodiment of the present invention. As shown in FIG. 2, in an SC-PTM technology, service data may be simultaneously scheduled for a plurality of terminal devices in a cell by using a G-RNTI, and each G-RNTI may be associated with one multimedia broadcast multicast service (MBMS). Therefore, in an area, data only needs to be sent to a cell that includes the terminal device, and does not need to be sent to a cell that does not include the terminal device. In this way, air interface resources can be saved.

In the SC-PTM technology, a multicast service may be transmitted by using a physical downlink shared channel (PDSCH). A PDSCH carrying multicast data is different from a PDSCH carrying unicast data, and may be referred to as a multicast PDSCH. In the SC-PTM technology, an access network device may send, to a group of terminal devices in a cell, downlink control information (DCI) carried on a physical downlink control channel (PDCCH). After receiving the DCI, the group of terminal devices may receive the multicast PDSCH based on scheduling information included in the DCI.

Figure 3:
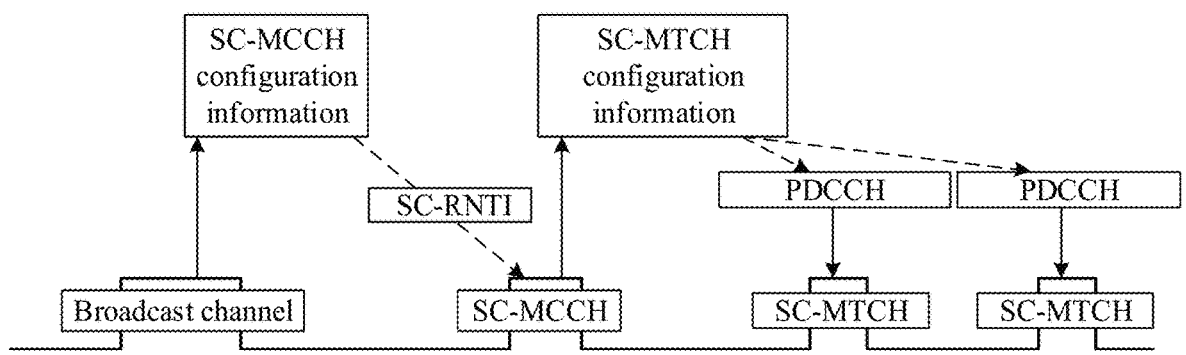
FIG. 3 is a schematic diagram of SC-PTM channel configuration according to an embodiment of the present invention.

FIG. 3 is a schematic diagram of SC-PTM channel configuration according to an embodiment of the present invention. As shown in FIG. 3, SC-PTM is configured with a single cell MBMS point-to-multipoint control channel (sSC-MCCH) and a single-cell MBMS traffic channel (SC-MTCH). The SC-MCCH is used to transmit control information, including configuration information of the SC-MTCH, for example, a G-RNTI and a discontinuous reception (DRX) mode parameter that correspond to the SC-MTCH. The SC-MCCH is used to periodically transmit data.

Configuration information of the SC-MCCH may be transmitted by using a broadcast channel. The configuration information of the SC-MCCH is used to configure a receiving parameter of the SC-MCCH, and may include a modification periodicity, a repetition periodicity, sending duration, and the like of the MCCH. The SC-MCCH uses a PDSCH for transmission, and a PDCCH corresponding to the PDSCH is scrambled by using a single cell RNTI (SC-RNTI) A value of the SC-RNTI is fixed in a specification and does not need to be configured through broadcast.

The configuration information of the SC-MTCH may be transmitted through the SC-MCCH. The configuration information of the SC-MTCH may include configuration information of a multicast service. Configuration information of each service may include a temporary multicast group identifier (TMGI) of the service, a corresponding G-RNTI, a DRX parameter, and information about a neighboring cell in which the configuration information of the service is sent. The SC-MTCH is also carried on a PDSCH, and a PDCCH corresponding to the PDSCH is scrambled by using a G-RNTI.

For multicast service transmission, for example, SC-PTM, because the multicast service is sent in one-to-many manner, an access network device performs blind sending regardless of receiving quality of a specific terminal device. When receiving quality of a terminal device is poor, a unicast bearer needs to be set up, and the unicast bearer is used to transmit the service. Consequently, service continuity cannot be ensured, and communication efficiency is reduced.

Figure 4:
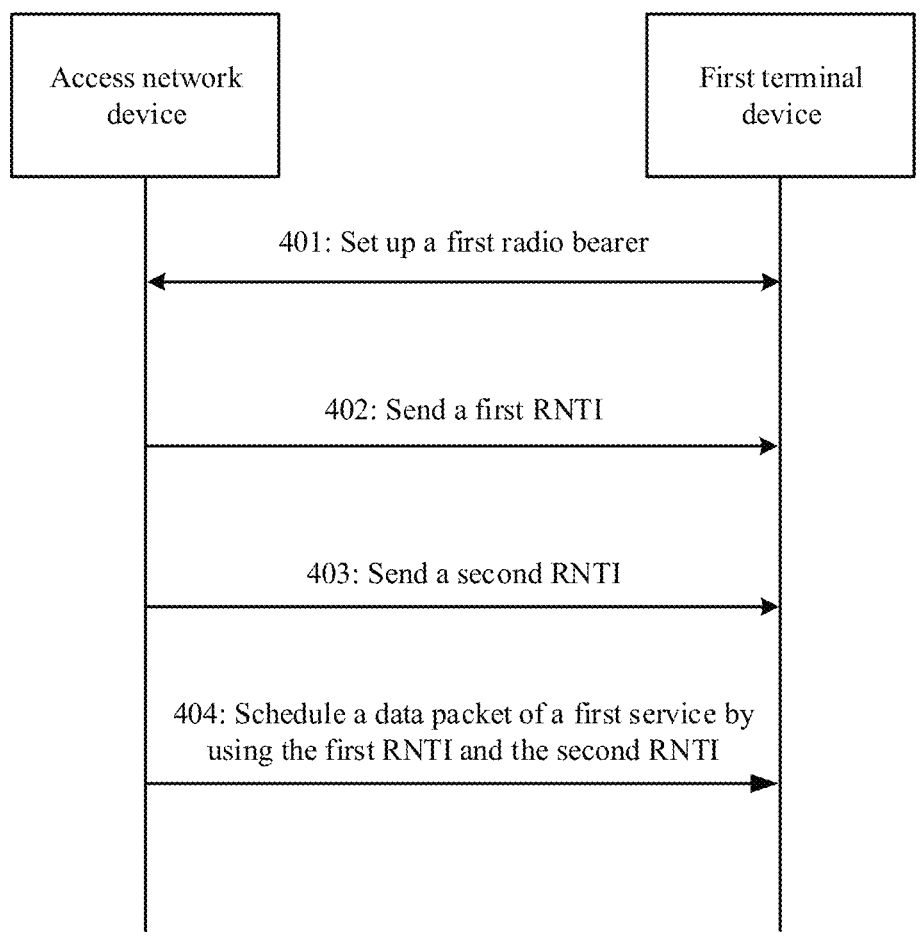
FIG. 4 is a schematic flowchart of a communication method according to an embodiment of the present invention.

Based on the network architecture shown in FIG. 1, FIG. 4 is a schematic flowchart of a communication method according to an embodiment of the present invention. As shown in FIG. 4, the communication method may include the following steps.

401: An access network device sets up a first radio bearer to a first terminal device.

When the access network device has a first service that needs to be transmitted to the first terminal device, the access network device may set up the first radio bearer to the first terminal device. After receiving a quality of service (QoS) parameter of the first service sent by a core network device, the access network device may set up the first radio bearer for the first service based on a requirement of the QoS parameter, and then may send a parameter of the first radio bearer to the first terminal device. The first radio bearer is a bearer for transmitting the first service between the access network device and the first terminal device. Specifically, the parameter of the first radio bearer may include one or more of the following:

(1) radio bearer information, where the radio bearer information may include an identifier of the first radio bearer;

(2) a PDCP layer configuration parameter, where the PDCP layer configuration parameter may include a PDCP sequence number length, an encryption parameter, a header compression parameter, and the like;

(3) an RLC layer configuration parameter, where the RLC layer configuration parameter may include a logical channel number, an RLC sequence number length, an RLC mode, and the like, and the RLC mode may be an acknowledged mode (AM), may be an unacknowledged mode (UM), or may be a transparent mode (TM); and (4) a MAC layer configuration parameter.

402: The access network device sends a first RNTI to the first terminal device.

The access network device may allocate the first RNTI to the first terminal device, and send the first RNTI to the first terminal device, and the first RNTI may be used to schedule a service for the first terminal device. In other words, the first RNTI can be used for scheduling the service only for the first terminal device, and cannot be used for scheduling a service for another terminal device. The scheduled service may be all services of the first terminal device, or may be scheduling signaling of the first terminal. To be specific, both the services and the signaling transmitted between the access network device and the first terminal device may be scheduled by using the first RNTI. The first RNTI may be a cell radio network temporary identifier (C-RNTI), or may be another RNTI that can be used for scheduling a unicast service. Step 401 and step 402 may be performed in serial or in parallel. The first RNTI may be allocated before step 401. For example, the first RNTI may be allocated in a process in which the first terminal device accesses a current cell, or may be allocated in a process in which the first terminal device is handed over from another cell to a current cell. Alternatively, the first RNTI may be allocated when or after step 401 is performed.

403: The access network device sends a second RNTI to the first terminal device.

The access network device may allocate the second RNTI to the first terminal device, and send the second RNTI to the first terminal device. When the first service is a multicast service, when or after step 401 is performed, the access network device may further allocate the second RNTI to the first terminal device, and the second RNTI may be used to schedule the first service for a group of terminal devices including the first terminal device. In other words, the second RNTI may not only be used for scheduling the first service for the first terminal device, but also be used for scheduling the first service for another terminal device. That is, the second RNTI is used for scheduling the multicast service. The second RNTI may be a G-RNTI, or may be another RNTI that can be used for scheduling the multicast service.

Step 403 and step 402 may be performed together or separately. For example, in a handover scenario, when a source access network device requests to hand over a terminal device to a target access network device, the target access network device allocates a radio bearer parameter to the terminal device, allocates the first RNTI and the second RNTI, and sends the first RNTI and the second RNTI to the terminal device by using the source access network device. When a terminal device initially accesses the access network device, the access network device first allocates the first RNTI to the terminal device, and then subsequently allocates the second RNTI when the first service for the terminal device is set up.

404: The access network device schedules a data packet of the first service for the first terminal device on the first radio bearer by using the first RNTI and the second RNTI.

After the access network device sets up the first radio bearer for the first terminal device, and sends the first RNTI and the second RNTI to the first terminal device, the access network device may schedule the data packet of the first service for the first terminal device by using the first RNTI and the second RNTI. The data packet of the first service is transmitted by using the first radio bearer. Correspondingly, the first terminal device may receive, by using the first RNTI and the second RNTI, the data packet that is of the first service and that is scheduled by the access network device, and process the data packet of the first service by using the configuration parameter related to the first radio bearer.

The access network device may simultaneously schedule data packets of the first service for the first terminal device on the first radio bearer by using the first RNTI and the second RNTI. In other words, the access network device schedules the data packet of the first service for the first terminal device on the first radio bearer by using the first RNTI, and simultaneously schedules the data packet of the first service for the first terminal device on the first radio bearer by using the second RNTI. Correspondingly, the first terminal device may simultaneously receive, on the first radio bearer by using the first RNTI and the second RNTI, the data packets that are of the first service and that are scheduled by the access network device. In other words, the first terminal device receives, on the first radio bearer by using the first RNTI, the data packet that is of the first service and that is scheduled by the access network device, and the first terminal device may simultaneously receive, on the first radio bearer by using the second RNTI, the data packet that is of the first service and that is scheduled by the access network device. The data packets of the first service scheduled by using the first RNTI and the second RNTI may be the same, that is, all the data packets of the first service are scheduled, or may be different, to be specific, the data packets scheduled by using the first RNTI and the second RNTI may be partially the same, or may be completely different. For example, the first RNTI is used for scheduling a part of data packets of the first service, and the second RNTI is used for scheduling a remaining part of data packets of the first service.

Alternatively, the access network device may first schedule the data packet of the first service for the first terminal device on the first radio bearer by using the second RNTI, and the first terminal device receives, on the first radio bearer by using the second RNTI, the data packet that is of the first service and that is scheduled by the access network device. Then, the first terminal device determines whether the data packet of the first service is successfully transmitted. When determining that the data packet of the first service fails to be transmitted, the first terminal device sends, to the access network device, feedback information used to indicate that the data packet of the first service fails to be transmitted. After receiving the feedback information that is from the first terminal device and that is used to indicate that the data packet of the first service fails to be transmitted, the access network device retransmits the data packet of the first service to the first terminal device on the first radio bearer by using the first RNTI. When the first terminal device determines that the data packet of the first service is successfully transmitted, the first terminal device sends, to the access network device, feedback information used to indicate that the data packet of the first service is successfully transmitted, and the access network device receives, from the first terminal device, the feedback information used to indicate that the data packet of the first service is successfully transmitted, and ends transmission of the data packet of the first service.

Specifically, for a same service, selecting to use a G-RNTI for scheduling or selecting to use a C-RNTI for scheduling may be performed based on the following principle: When only one terminal device receives a same service, the C-RNTI is used, and when a plurality of terminal devices receive a same service, the G-RNTI is used; an RNTI used for scheduling that generates a larger throughput is used, where, for example, the C-RNTI may be used for scheduling 1000-bit data for a terminal device 1 and 2000-bit data for a terminal device 2, the G-RNTI may be used for scheduling only 200-bit data for the terminal device 1 and the terminal device 2 once, and the C-RNTI is used for scheduling the data for the terminal device 1 and the terminal device 2 in this case; or when the terminal device consecutively fails to perform scheduling by using the G-RNTI, scheduling by using the C-RNTI may be performed.

Specifically, the first terminal device may receive, by using the first RNTI, a first data packet that is of the first service and that is from the access network device, receive, by using the second RNTI, a second data packet that is of the first service and that is from the access network device, and then combine the first data packet and the second data packet onto the first radio bearer. For example, the first data packet and the second data packet are data packets at a MAC layer. The first terminal device may combine, at an RLC layer, RLC PDUs included in the first data packet and the second data packet onto the first radio bearer. That is, the RLC PDU included in the first data packet and the RLC PDU included in the second data packet are sorted and/or deduplicated. Alternatively, the first data packet and the second data packet are data packets at an RLC layer. The first terminal device combines, at a PDCP layer, PDCP PDUs included in the first data packet and the second data packet onto the first radio bearer. That is, the PDCP PDU included in the first data and the PDCP PDU included in the second data packet are sorted and/or deduplicated. Deduplication means deletion of duplicate data.

Figure 5:
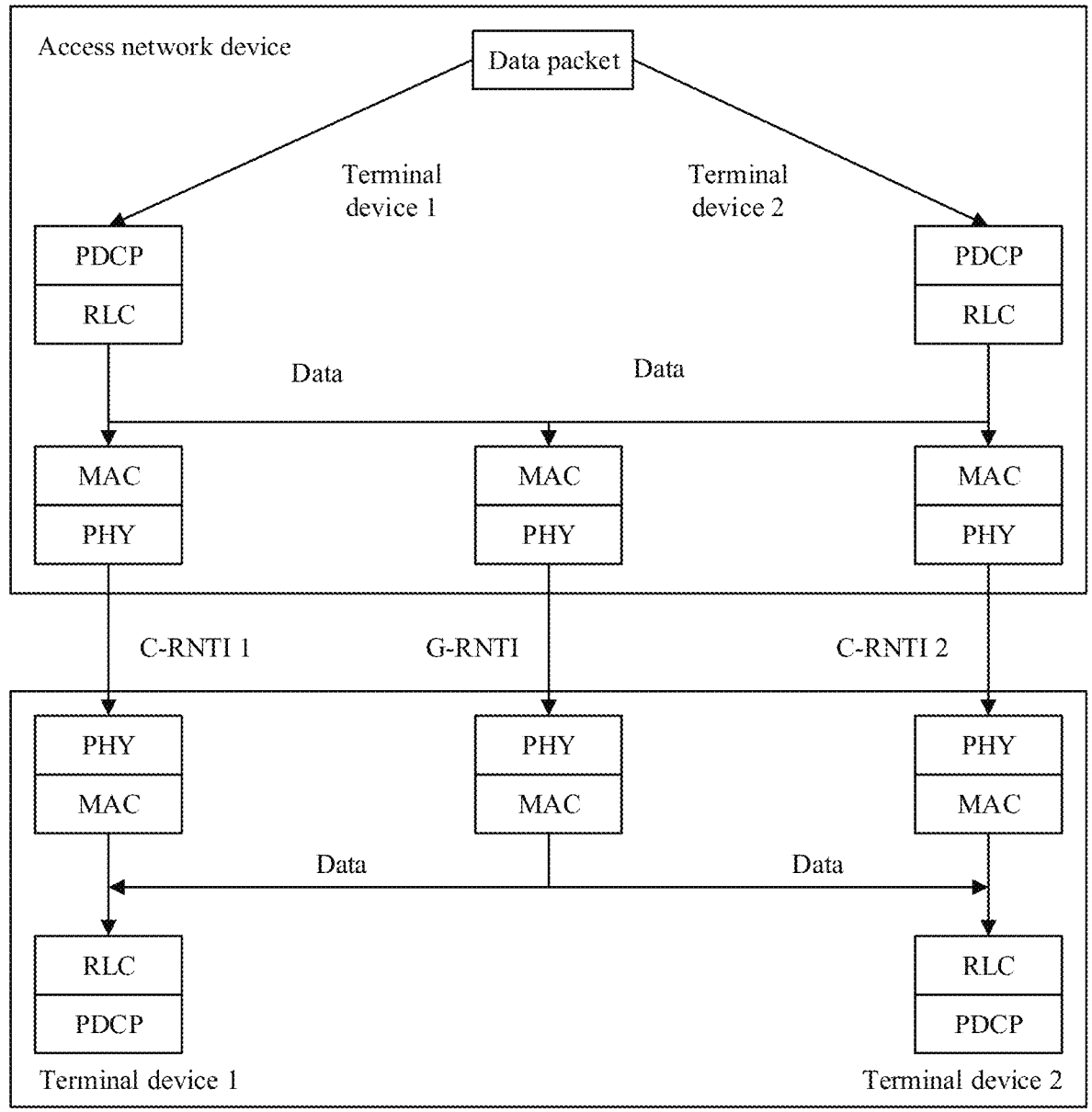
FIG. 5 is a schematic diagram of data combination according to an embodiment of the present invention.

FIG. 5 is a schematic diagram of data combination according to an embodiment of the present invention. As shown in FIG. 5, after helping data of each terminal device pass through a PDCP layer and an RLC layer, an access network device may sequentially transmit the data to the terminal device through a MAC layer and a physical (PHY) layer by using a C-RNTI and a G-RNTI. The terminal device sequentially receives the data through the PHY layer and the MAC layer by using the C-RNTI and the G-RNTI, and then combines, at the RLC layer and/or the PDCP layer, the data received by using the C-RNTI and the G-RNTI onto a unicast bearer for processing.

Figure 6:
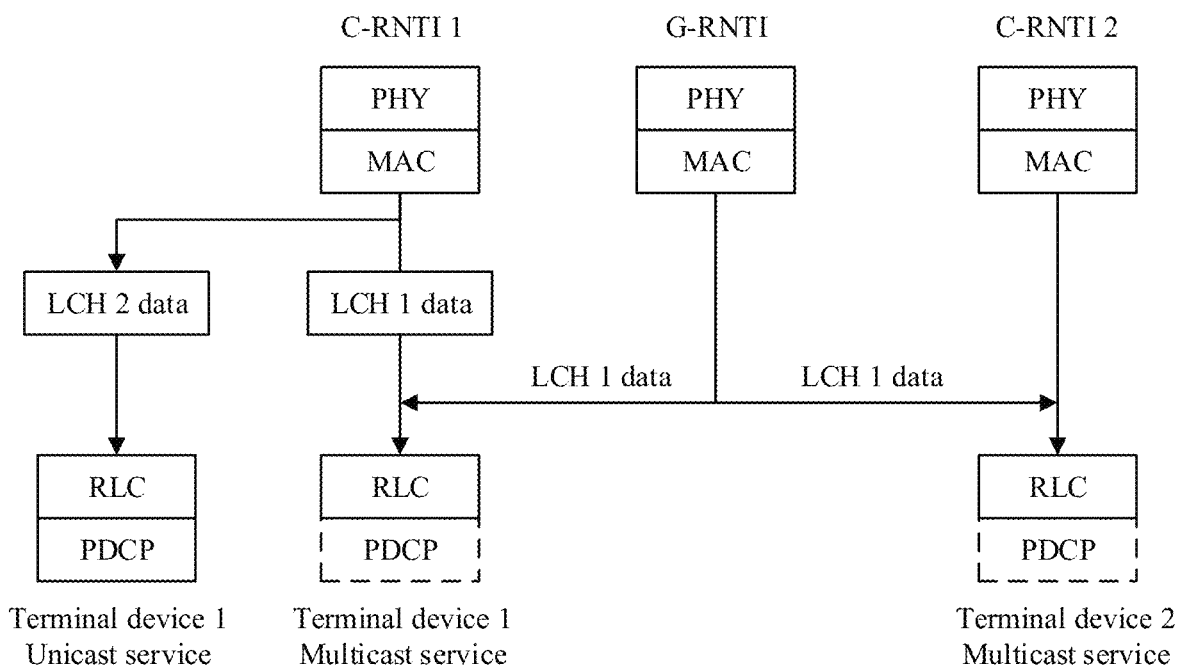
FIG. 6 is a schematic diagram of combining data at an RLC layer for processing according to an embodiment of the present invention.

FIG. 6 is a schematic diagram of combining data at an RLC layer for processing according to an embodiment of the present invention. As shown in FIG. 6, a terminal device 1 receives, by using C-RNTI 1, a multicast service whose logical channel (LCH) identifier is LCH 1 and a unicast service whose LCH identifier is LCH 2. The terminal device 1 and a terminal device 2 receive, by using a G-RNTI, a multicast service whose LCH identifier is LCH 1. After receiving, by using the C-RNTI 1, the multicast service whose LCH identifier is LCH 1 and receiving, by using the G-RNTI, the multicast service whose LCH identifier is LCH 1, the terminal device 1 combines the data at an RLC layer for processing.

Figure 7:
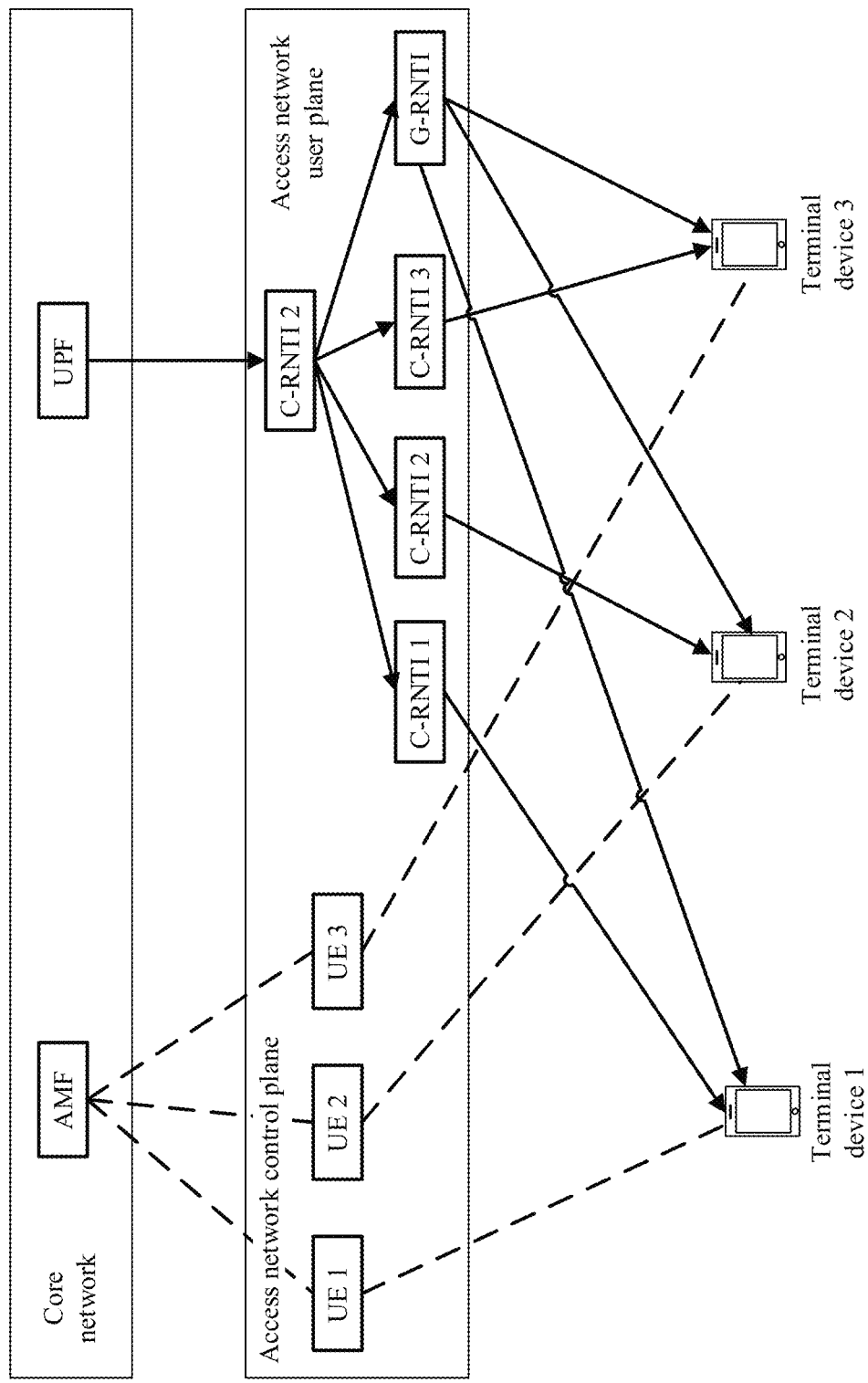
FIG. 7 is a schematic diagram of allocating a C-RNTI and a G-RNTI to a terminal device according to an embodiment of the present invention.

FIG. 7 is a schematic diagram of allocating a C-RNTI and a G-RNTI to a terminal device according to an embodiment of the present invention. As shown in FIG. 7, a dashed line represents a control plane connection, and a solid line represents a sending path of user data. Three terminal devices are all connected to an access network device. A C-RNTI and a data radio bearer (DRB) used for a unicast bearer are configured for each terminal device, and the DRB is also associated with a G-RNTI. Dynamic switching between unicast and multicast is implemented by using the G-RNTI and the C-RNTI that are used for scheduling. In FIG. 7, the three terminal devices receive a same service. Each terminal device has the unicast bearer, namely, a channel for receiving data based on the C-RNTI. The access network device further configures a same G-RNTI for the three terminal devices. When the C-RNTIs are used for scheduling, the access network device may schedule a same piece of data for the three terminal devices separately. In this case, unicast scheduling is used. When the G-RNTI is used for scheduling data, the access network device schedules one piece of data and all three terminal devices can receive the data.

Figure 8:
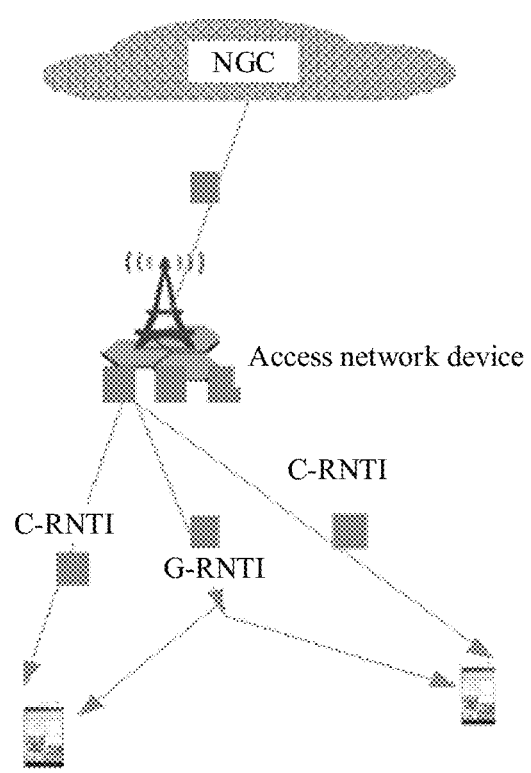
FIG. 8 is another schematic diagram of allocating a C-RNTI and a G-RNTI to a terminal device according to an embodiment of the present invention.

FIG. 8 is another schematic diagram of allocating a C-RNTI and a G-RNTI to a terminal device according to an embodiment of the present invention. As shown in FIG. 8, in 5G, service data is transmitted between a new radio core (NGC) network device and an access network device. Two terminal devices correspond to different C-RNTIs and a same G-RNTI. The C-RNTI is used by the terminal device to receive scheduling information for a single terminal device, and the C-RNTI may be used for scheduling signaling or data transmission for a single user. The G-RNTI is used to simultaneously schedule a plurality of terminal devices to receive a same service. For a same service, if the C-RNTI is used for scheduling, only a terminal device configured with the C-RNTI can receive the service; or if the G-RNTI is used for scheduling, the plurality of terminal devices can receive the service.

Figure 9:
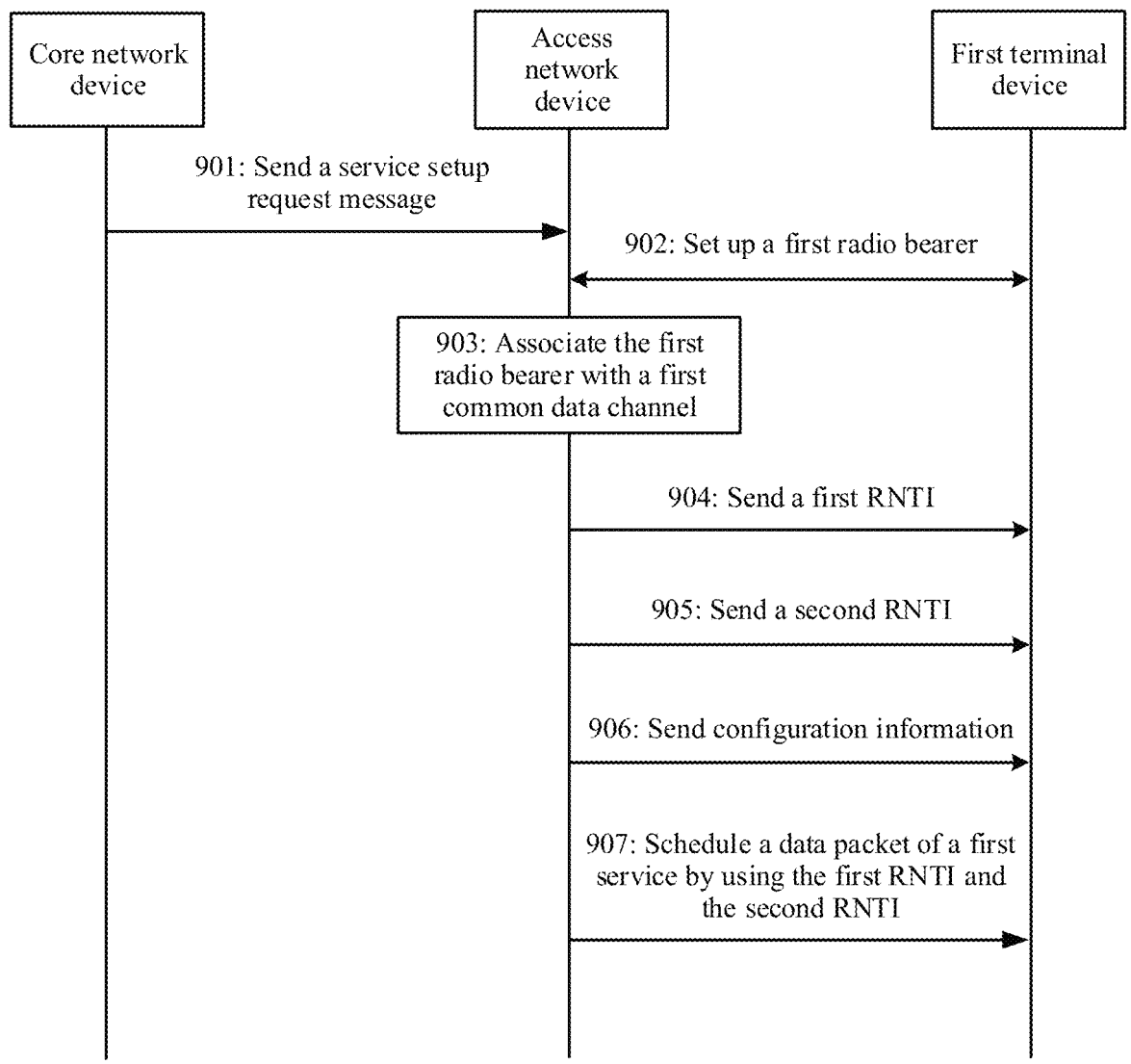
FIG. 9 is a schematic flowchart of another communication method according to an embodiment of the present invention.

Based on the network architecture shown in FIG. 1, FIG. 9 is a schematic flowchart of another communication method according to an embodiment of the present invention. As shown in FIG. 9, the communication method may include the following steps.

901: A core network device sends a service setup request message to an access network device.

When there is a first service that needs to be transmitted, the core network device may send the service setup request message to the access network device. The service setup request message may be carried in a message such as an initial context setup message, a protocol data unit (PDU) session setup message, or a context modification message. The first service is a multicast service.

In one case, the service setup request message may carry common information used to indicate that the first service is the multicast service. To be specific, when the service setup request message carries the common information, a service to be set up corresponding to the service setup request message is the multicast service; when the service setup request message does not carry the common information, the service to be set up corresponding to the service setup request message is a unicast service. The common information may be service information of the multicast service, and the service information may be a TMGI, or may be other service information that may indicate the multicast service.

The common information may alternatively be address information of the multicast service, and the access network device may join a multicast group corresponding to the address information, to receive the first service. A correspondence between common information and a service may be a correspondence between a quality of service (QoS) flow and the common information. The correspondence between the QoS flow and the common information may be shown in Table 1.

TABLE 1

Correspondence between a QoS flow and common information

| Service information | Common information |
| --- | --- |
| QoS flow 1 and QoS flow 2 | Service 1/Multicast group address information 1 |
| QoS flow 3 | Service 2/Multicast group address information 2 |
| QoS flow 4 | Null |

A plurality of QoS flows of a terminal device may correspond to a plurality of pieces of common information. As shown in Table 1, common information corresponding to the QoS flow 1 and the QoS flow 2 is the service 1 or multicast group address information 1, and common information corresponding to the QoS flow 3 is the service 2 or multicast group address information 2. The QoS flow 1, the QoS flow 2, and the QoS flow 3 all have corresponding common information. Therefore, services corresponding to the QoS flow 1, the QoS flow 2, and the QoS flow 3 are multicast services. The service 1 and the service 2 are service information of the multicast services, and the multicast group address information 1 and the multicast group address information 2 are address information of the multicast services. Some QoS flows may have no common information. As shown in Table 1, the QoS flow 4 has no common information, indicating that content of the QoS flow 4 is not the same as content of another terminal device, in other words, a service corresponding to the QoS flow 4 is a unicast service. Optionally, the service information in Table 1 may alternatively be an identifier (ID) of a DRB. In other words, the QoS flow in Table 1 may be replaced with the ID of the DRB.

In another case, the service setup request message may directly indicate that the first service is the multicast service. To be specific, when the service setup request message indicates that a service to be set up corresponding to the service setup request message is the multicast service, the service to be set up corresponding to the service setup request message is the multicast service; when the service setup request message does not indicate that the service to be set up corresponding to the service setup request message is the multicast service, the service to be set up corresponding to the service setup request message is a unicast service.

Optionally, if a plurality of access network devices are connected to the core network device, and the plurality of access network devices all set up bearers for a same service, to ensure that the service can be continuously received when a terminal device moves between different access network devices, it needs to be ensured that the core network device uses same data packet numbers when sending the same service to the plurality of access network devices. The data packet number may be a GPRS tunneling protocol (GTP) number, or may be another number having an equivalent function. For example, both the access network device 1 and the access network device 2 are connected to the core network device, UE 1 and UE 2 in the access network device 1 simultaneously receive a service 1, and UE 3 and UE 4 in the access network device 2 simultaneously receive the service 1. If UE 1 moves from the access network device 1 to the access network device 2, UE 1 is handed over to the access network device 2, and service data of UE 1 is forwarded to the access network device 2. The access network device 2 may allocate a same G-RNTI to UE 1, UE 3, and UE 4 for scheduling together. To determine data that has been transmitted by UE 1, the access network device 2 may determine, based on a data packet number of a forwarded data packet of UE 1, a sequence of a data packet of UE 3 and a data packet of UE 4. Transmission progresses of UE 1, UE 3, and UE 4 may be aligned, and then transmission is performed. Because the access network devices use the same data packet numbers, after UE 1 is handed over to the access network device 2, a difference between the transmission progress of the UE 1 and the transmission progress of the UE 3 and the UE 4 currently served by the access network device 2 may be determined based on the data packet numbers. For UE served by a same access network device, if no common transmission bearer is used, data packet numbers may also be used to determine whether content of the data packets transmitted to the UE is the same. For example, both UE 1 and UE 2 have dedicated data channels to the core network device and the access network device 1, and data packets that correspond to the two pieces of UE and whose content is the same may be determined based on numbers of data packets transmitted through the two dedicated data channels. Further, a same data packet may be scheduled for the two pieces of UE at the same time by using the G-RNTI.

Optionally, before step 901, a connection used to receive the first service may be set up between the terminal device, the core network device, and an application server. The connection used to receive the first service includes a PDU session between the terminal device and the core network device, and a data channel between the core network device and the application server. Before the terminal device interacts with the application server, the application server needs to learn that the terminal device needs to receive data of the first service, and the application server may trigger a PDU session modification procedure that mainly includes the following steps.

(1) The application server provides identification information related to the first service to the core network device, where the identification information is used by the core network device to identify downlink data corresponding to the first service as the multicast service.

Specifically, the application server provides the identification information of the first service for a policy control function (PCF) network element in a core network. After receiving the identification information of the first service from the application server, the PCF network element in the core network may initiate the PDU session modification procedure, and may provide the identification information of the first service to an SMF network element in the core network. The SMF network element in the core network sets up a transmission resource for the first service based on the identification information of the first service, where the transmission resource may be a service QoS flow.

(2) The core network device sends the service setup request message to the access network device. The service setup request message may include one or more of the service information, common information of the multicast service, and information indicating that the first service is the multicast service.

902: The access network device sets up a first radio bearer to a first terminal device.

After the access network device receives the service setup request message from the core network device, it is indicated that the first service that needs to be transmitted exists between the access network device and the first terminal device, and the first radio bearer to the first terminal device may be set up. For specific descriptions, refer to step 401.

The first service is the multicast service, and the first service may be scheduled for a plurality of terminal devices by using the G-RNTI. Therefore, encryption is not performed on the first radio bearer set up by the access network device for the first terminal device. Because different terminal devices use different keys for encryption, once the first service is encrypted, after the first service is scheduled for the plurality of terminal devices, only one of the plurality of terminal devices can correctly decrypt the first service, and other terminal devices cannot decrypt the first service. Consequently, multicast transmission of the multicast service cannot be implemented. Alternatively, to improve security, when setting up the first radio bearer for the first terminal device, the access network device may configure a public key for the first radio bearer, and the public key is a key shared by the plurality of terminal devices that receive the first service. When receiving the first service by using the first radio bearer, the plurality of terminal devices all perform decryption by using the public key. In this way, when scheduling is performed for the first terminal device, the access network device may perform scheduling by using the public key regardless of using the first RNTI or the second RNTI. Regardless of which RNTI is used for receiving, the terminal device may perform decryption by using the same public key. The public key may be configured by a network device, for example, may be configured by the access network device or the core network device for the terminal device through an encrypted signaling channel, or may be derived by the terminal device based on related information of the first service, where the related information of the first service may be a service identifier of the first service, may be a radio bearer identifier of the first service, may be the second RNTI, or may be other information related to the first service. For example, the second RNTI corresponding to the first service is 62348. The terminal device may perform a mask operation on the second RNTI and a first sequence to obtain a second sequence, and may use the second sequence as the key. The first sequence may be configured by the network device for the terminal device, or may be a fixed sequence.

903: The access network device associates the first radio bearer with a first common data channel.

This step is optional. The access network device associates the first radio bearer with the first common data channel to reduce overheads of transmitting the data of the first service between the core network and the access network device. When the plurality of terminal devices all receive the first service, the common data channel is used to avoid repeatedly sending the data of the first service to the plurality of terminal devices. If this step is not performed, a dedicated data channel is still set up between the access network device and the core network device. In this way, when all the terminal devices receive the first service, there are different dedicated data channels between the access network device and the core network device for all the terminal devices. The data of the first service may be sent to the access network device on the dedicated channels.

After determining, based on the service setup request message, that the first service is the multicast service, the access network device associates the first radio bearer with the first common data channel, where the first common data channel is a common data channel used to transmit the data of the first service between the access network device and the core network device. After the access network device receives the data of the first service from the core network device through the first common data channel, the access network device sends the received data of the first service to the first terminal device on the first radio bearer. The first common data channel may serve all the terminal devices that receive the first service.

Setup of the first common data channel may be triggered by the access network device, or may be triggered by the core network device. When setup of the first common data channel is triggered by the access network device, after receiving the service setup request message, the access network device may return, to the core network device, information about a downlink address for receiving the first service. The address corresponding to the information about the downlink address is used for receiving one or more QoS flows corresponding to the first service. When the first common data channel is set up in this method, the common information is the service information of the multicast service. Setup of the first common data channel triggered by the access network device may also be performed by using an internet protocol (IP) multicast protocol. For example, the access network device sends a multicast group join request to the core network device, to receive data of a multicast group. After the access network device successfully joins the multicast group, it may be considered that the first common data channel is successfully set up, and the access network device receives, from the core network device, the data corresponding to the first service.

When setup of the first common data channel is triggered by the core network device, the core network device may initiate, to the access network device, a common data channel setup request that carries the service identifier, and setup of the common data channel succeeds after the access network device determines the setup.

The first common data channel may be previously set up. Only associating the first radio bearer with the first common data channel is performed herein. For example, after the access network device associates the first radio bearer with the first common data channel, after the access network device receives a service setup request message for another terminal device, when the service setup request message is a service setup request message used to set up the first service, the first common data channel may be directly used without needing to be set up. For another example, the access network device already sets up a common data channel for common information 1 (or a service 1 or multicast group address information 1), and directly associates the common channel with the service. Alternatively, the first common data channel may not be set up before. In this case, the first common data channel is set up and associated. For a process of setting up the first common data channel, refer to the foregoing descriptions.

904: The access network device sends the first RNTI to the first terminal device.

Step 904 is the same as step 402. For detailed descriptions, refer to step 402. Details are not described herein again.

905: The access network device sends the second RNTI to the first terminal device.

Step 905 is the same as step 403. For detailed descriptions, refer to step 403. Details are not described herein again.

906. The access network device sends configuration information to the first terminal device.

When or after allocating the second RNTI to the first terminal device, the access network device may send the configuration information to the first terminal device. The configuration information may include one or more of bandwidth part (BWP) information corresponding to the second RNTI, control resource set (CORESET) information corresponding to the second RNTI, and search space information corresponding to the second RNTI. The CORESET information indicates a time-frequency resource at which a G-RNTI PDCCH is located.

A BWP may be considered as a bandwidth part of a cell. Each terminal device may work on several BWPs configured for the terminal device, but only one BWP is activated at any moment. Main parameters of the BWP may include a bandwidth, a frequency location, subcarrier spacing (SCS), a cyclic prefix (CP) length, configuration information related to a CORSET, and configuration information related to a PDSCH. For a cell, there is at least one initial BWP, and all common information such as broadcast and paging is sent on the initial BWP. After the terminal device enters a connected mode, the access network device may further configure some dedicated BWPs for the terminal device. The first terminal device may determine, based on the BWP, an SCS, a frequency domain location, a CP length, and the like that correspond to the BWP.

The configuration information may further include a PDSCH scrambling sequence of the first service, so that the first terminal device may descramble a PDSCH of the first service by using the PDSCH scrambling sequence. The configuration information may further include a DRX parameter of the G-RNTI, so that the first terminal device performs G-RNTI detection by using the DRX parameter. The configuration signal may further include a demodulation reference signal, so that the first terminal device demodulates, by using the demodulation reference signal, a PDSCH scheduled by using the G-RNTI. The configuration information may further include a rate matching reference signal, so that when receiving the PDSCH scheduled by using the G-RNTI, the first terminal device may exclude a location corresponding to the demodulation reference signal.

Optionally, the access network device may send indication information to the first terminal device, where the indication information may indicate that the second RNTI is used for scheduling the first service. The indication information may be separately sent by the access network device to the first terminal device, or may be included in the foregoing configuration information and sent together. The indication information may be a relationship between the G-RNTI and association information of the service, for example, a relationship between a G-RNTI and an LCH, a relationship between a G-RNTI and a DRB, and a relationship between a G-RNTI and a service identifier. Alternatively, the indication information may be the service information associated with the DRB. For example, the network sets that a DRB 1 is associated with the multicast service, and the terminal device may consider that the G-RNTI is used to receive data of the DRB 1.

The configuration information may further include service information associated with the second RNTI, such as a logical channel identifier, a TMGI, and a DRB ID, so that the first terminal device may determine, based on the information, a service to which a service scheduled by using the second RNTI belongs. In this way, data sent by using the G-RNTI does not need to carry the logical channel identifier.

907: The access network device schedules the data packet of the first service for the first terminal device on the first radio bearer by using the first RNTI and the second RNTI.

Step 907 is similar to step 404. For detailed descriptions, refer to step 404. Details are not described herein again.

Specifically, after receiving the configuration information from the access network device, the first terminal device may detect, on the first radio bearer based on the second RNTI and the configuration information, the data packet of the first service from the access network device.

When the access network device does not send, to the first terminal device, the indication information used to indicate that the second RNTI is used for scheduling the first service, the data packet of the first service may include a logical channel identifier, and the logical channel identifier may indicate that the data packet transmitted by using the second RNTI is the data packet of the first service.

When the access network device schedules the service by using the G-RNTI, a terminal device 1 feeds back a NACK, and the access network device may perform retransmission scheduling by using a C-RNTI. In this way, the G-RNTI may continue to be used for scheduling new data, to ensure that the terminal device 1 and another terminal device that correctly receives data can continue to receive the new data. The terminal device 1 that does not correctly receive data may perform retransmission receiving by using the C-RNTI. In other words, retransmission of the data of the terminal device 1 is ensured, and reception of the new data of the another terminal device is not affected. When data retransmission is performed by using a hybrid automatic repeat request (HARQ) mechanism, it needs to be ensured that a same HARQ process is used for new transmission and retransmission. However, it is difficult to ensure that a same HARQ process is used for new transmission by using the G-RNTI and retransmission by using the C-RNTI. This is because the G-RNTI is shared by the plurality of terminal devices, and process numbers scheduled by using the G-RNTI are consistent among the plurality of terminal devices. For example, if the G-RNTI is used for scheduling a process 8, all terminal devices that use the G-RNTI use the process 8. If the terminal device 1 retransmits a data packet scheduled by using the G-RNTI, the process 8 cannot be used. In this case, a process, for example, a process 6, needs to be used for replacement. However, after the process is used for replacement, the terminal device cannot determine that the process 6 after replacement is used to schedule retransmission corresponding to the process 8. Therefore, the access network device needs to notify the terminal device of a relationship between the process 6 and the process 8, to notify the terminal device that the process 6 is currently used for retransmission for the process 8. Therefore, when the second RNTI is used for initial transmission of the data packet of the first service, and the first RNTI is used for retransmission of the data packet of the first service, the access network device may send an association relationship between a first process and a second process to the first terminal device. The first process is a process used for initial transmission of the data packet of the first service, and the second process is a process used for retransmission of the data packet of the first service. The access network device may configure the association relationship between the first process and the second process by using RRC. An example is an association relationship between the process 6 and the process 8, in other words, the process 6 is configured to retransmit data of the process 8. Then, when the process 6 is scheduled, a scheduling command such as DCI may indicate, to the terminal device, that current retransmission performed by using the process 6 is retransmission for an associated process. In this case, the DCI may indicate, by using one bit, that the current retransmission is retransmission for the associated process. Alternatively, when scheduling the second process, the access network device may indicate, to the terminal device in a scheduling command, that retransmission performed by using the current process is associated with the process 8. For example, when the process 6 is scheduled, the scheduling command may indicate, to the terminal device, that the retransmission performed by using the current process is associated with the process 8. In this case, three bits need to be added to the scheduling command for indication. The association relationship between the first process and the second process may be sent by the access network device to the first terminal device in the foregoing configuration information, or may be sent to the first terminal device when the data packet of the first service needs to be retransmitted subsequently.

Figure 10:
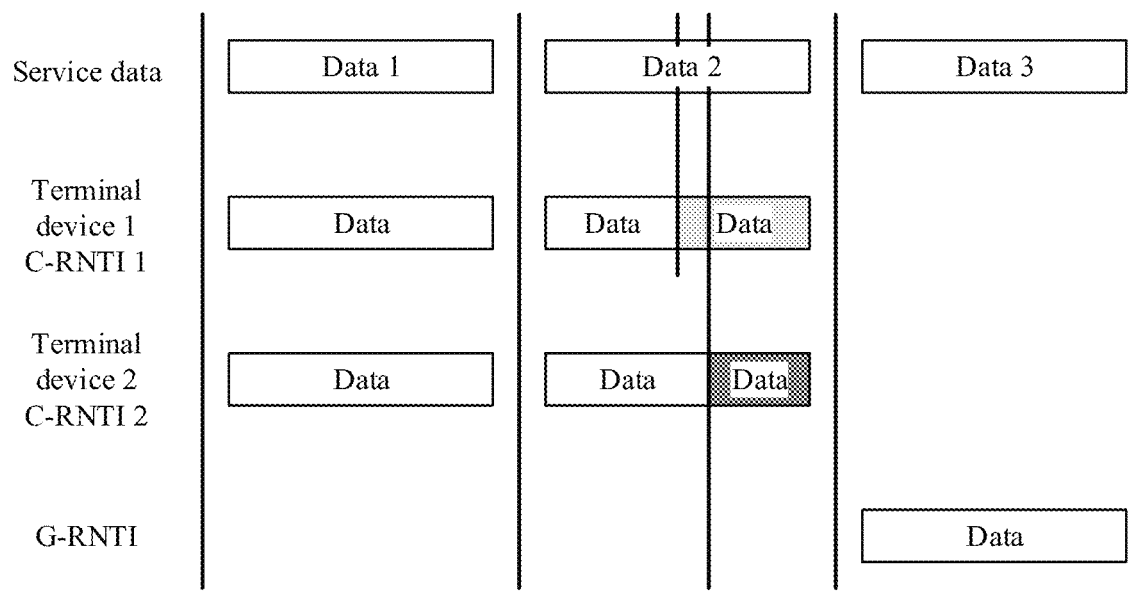
FIG. 10 is a schematic diagram of scheduling data by using a G-RNTI according to an embodiment of the present invention.

When the access network device performs scheduling by using the G-RNTI, it needs to be ensured that a plurality of data packets are scheduled from a same data location. FIG. 10 is a schematic diagram of scheduling data by using a G-RNTI according to an embodiment of the present invention. As shown in FIG. 10, service data currently sent to an access network device includes three data packets: data 1, data 2, and data 3. Initially, the terminal device 1 and the terminal device 2 separately perform scheduling by using a C-RNTI. Both the terminal device 1 and the terminal device 2 have completed transmitting the data 1 and some of the data 2, but remaining parts of the data 2 are different. In this case, after the G-RNTI is used, the G-RNTI needs to be used for scheduling starting from the data 3, and the remaining parts of the data 2 needs to be continuously scheduled by the terminal device 1 and the terminal device 2 by using respective C-RNTIs.

Figure 11:
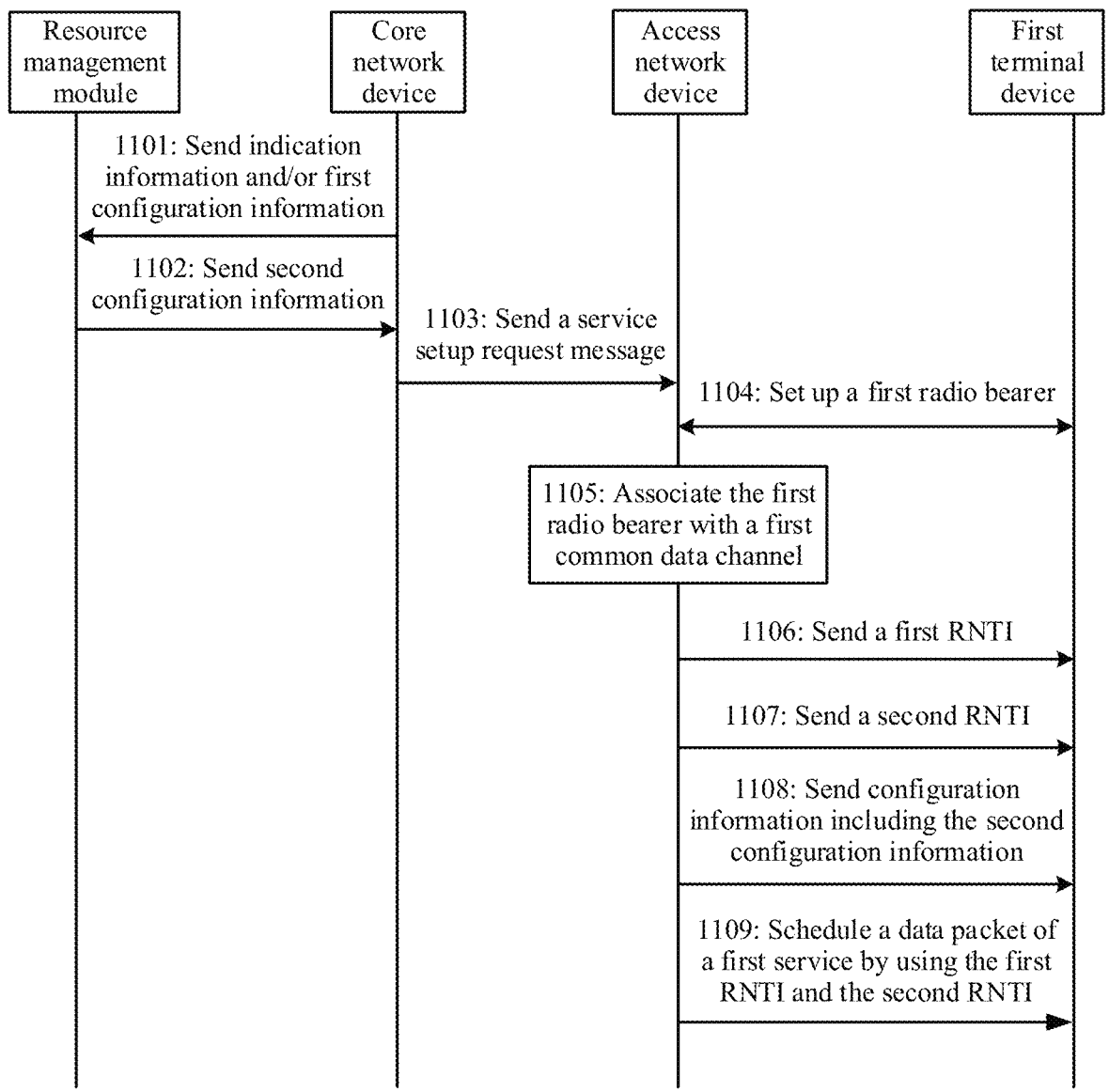
FIG. 11 is a schematic flowchart of still another communication method according to an embodiment of the present invention.

Based on the network architecture shown in FIG. 1, FIG. 11 is a schematic flowchart of still another communication method according to an embodiment of the present invention. As shown in FIG. 11, the communication method may include the following steps.

1101: An access network device sends, to a resource management module, indication information used to indicate a quantity of terminal devices receiving a first service and/or first configuration information of an RNTI used for the first service.

The access network device may send, to the resource management module in real time or periodically, the indication information used to indicate the quantity of terminal devices receiving the first service. Alternatively, the access network device may determine, in real time or periodically based on the quantity of terminal devices that receive the first service and that are in a cell covered by the access network device, that the first service is scheduled in a first cell by using a second RNTI, and then send the first configuration information to the resource management module. The first configuration information may include one or more of BWP information corresponding to the second RNTI, CORESET information corresponding to the second RNTI, search space information corresponding to the second RNTI, a PDSCH scrambling sequence of the first service, a demodulation reference signal, a DRX parameter of a G-RNTI, a rate matching reference signal, and the like. The resource management module may be an independent device, or may be integrated into the access network device. The resource management module is mainly configured to coordinate G-RNTIs and/or scheduling resources used between a plurality of cells or a plurality of access network devices.

1102. The resource management module sends, to the access network device, second configuration information corresponding to the first service.

After receiving the indication information that is from the access network device and that is used to indicate the quantity of terminal devices receiving the first service, the resource management module may determine, based on the indication information, that the first service may be scheduled in the plurality of cells by using the second RNTI, and may send the second configuration information corresponding to the first service to the access network device. The second configuration information includes configuration information of the second RNTI.

After receiving the first configuration information from the plurality of access network devices, when services of the plurality of cells are all the first service, the resource management module makes the second RNTIs used in the plurality of cells the same, and then may send the second configuration information corresponding to the first service to the access network device. The second configuration information includes configuration information of a transmission resource of the same second RNTI. The transmission resource may include one or more of the BWP information corresponding to the second RNTI, the CORESET information corresponding to the second RNTI, the search space information corresponding to the second RNTI, the PDSCH scrambling sequence of the first service, the demodulation reference signal, the DRX parameter of the G-RNTI, the rate matching reference signal, and the like. For example, a second RNTI and a transmission resource of a second cell may be modified based on the second RNTI and a transmission resource of the first cell, so that the two cells use the same second RNTI and resource.

When a same service is transmitted between the plurality of cells by using the same second RNTI and transmission resource, an air interface resource form a same signal, and a signal superposition effect may be caused during transmission in the plurality of cells, so that a receiving effect of the first service is enhanced.

1103: A core network device sends a service setup request message to the access network device.

Step 1103 is the same as step 901. For detailed descriptions, refer to step 901. Details are not described herein again.

1104: The access network device sets up a first radio bearer to a first terminal device.

Step 1104 is the same as step 902. For detailed descriptions, refer to step 902. Details are not described herein again.

1105: The access network device associates the first radio bearer with a first common data channel.

Step 1105 is the same as step 903. For detailed descriptions, refer to step 903. Details are not described herein again.

1106: The access network device sends the first RNTI to the first terminal device.

Step 1106 is the same as step 402. For detailed descriptions, refer to step 402. Details are not described herein again.

1107: The access network device sends the second RNTI to the first terminal device.

Step 1107 is the same as step 403. For detailed descriptions, refer to step 303. Details are not described herein again. In addition, the second RNTI may be allocated by the access network device based on the second configuration information.

1108: The access network device sends configuration information including the second configuration information to the first terminal device.

Step 1108 is similar to step 906. For detailed descriptions, refer to step 906. Details are not described herein again.

1109: The access network device schedules a data packet of the first service for the first terminal device on the first radio bearer by using the first RNTI and the second RNTI.

Step 1109 is the same as step 907. For detailed descriptions, refer to step 907. Details are not described herein again.

Figure 16:
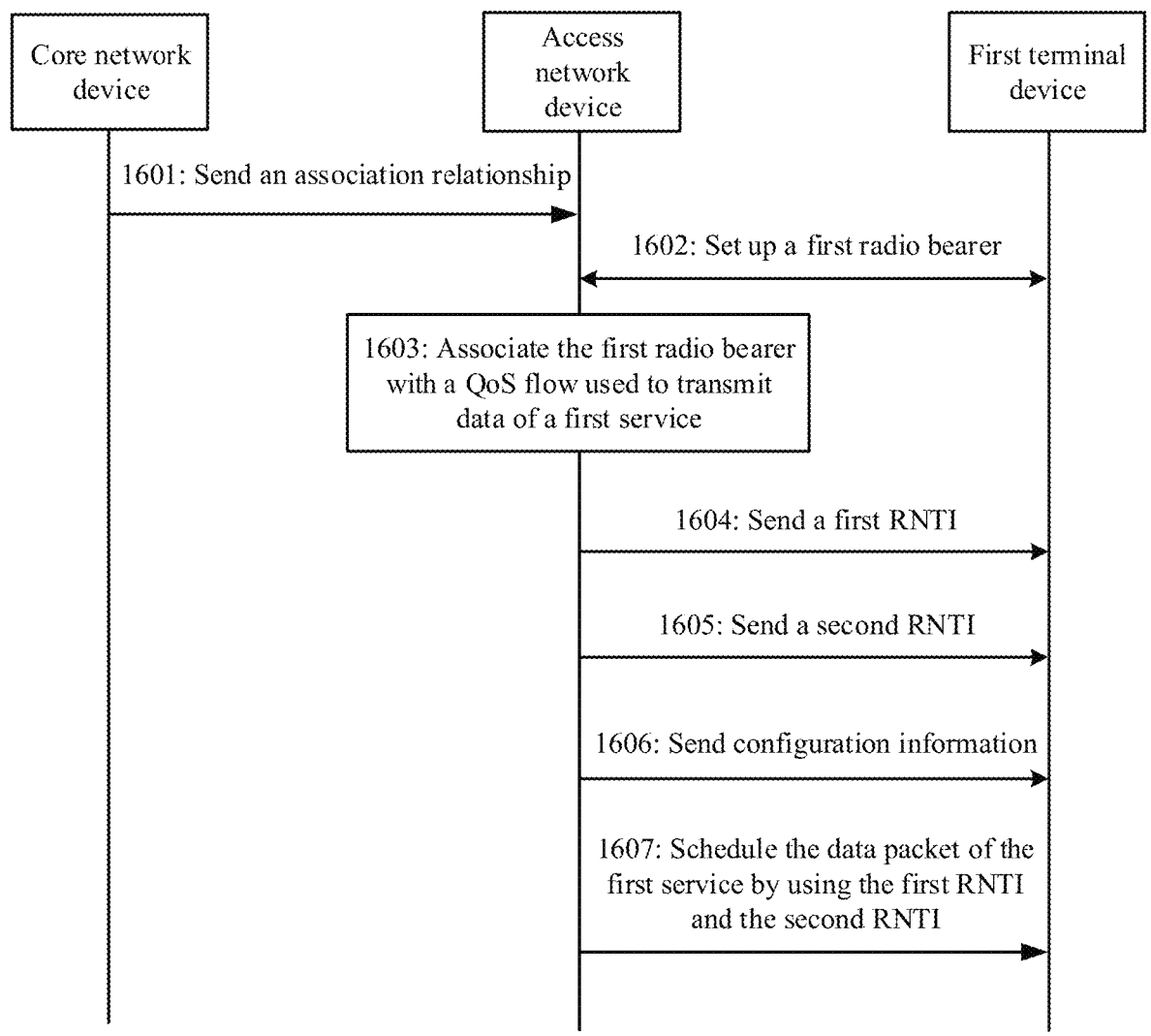
FIG. 16 is a schematic flowchart of still another communication method according to an embodiment of the present invention.

Based on the network architecture shown in FIG. 1, FIG. 16 is a schematic flowchart of still another communication method according to an embodiment of the present invention. As shown in FIG. 16, the communication method may include the following steps.

1601: A core network device sends an association relationship between a first terminal device and data of a first service to an access network device.

When there is to-be-sent data of the first service of the first terminal device, the core network device may send the association relationship between the first terminal device and the data of the first service to the access network device. The first service may be a multicast service, and the core network device may be an SMF network element. The first terminal device may be any terminal device in a group of terminal devices configured to transmit the multicast service (namely, the first service).

The core network device may receive a PDU session setup/modification request from the first terminal device, and then may set up, for the first terminal device, a first QoS flow used to receive the data of the first service. Then, the core network device may send the association relationship between the first terminal device and the data of the first service to the access network device.

The core network device may receive, from an application server, a message that is used to set up, for the first terminal device, a QoS flow used to receive the data of the first service, and then may set up, for the first terminal device, the first QoS flow used to receive the data of the first service. Then, the core network device may send the association relationship between the first terminal device and the data of the first service to the access network device.

The association relationship between the first terminal device and the data of the first service may include an association relationship between an identifier of the first QoS flow of the first terminal device and an identifier of a common QoS flow, where the common QoS flow is the QoS flow used to transmit the data of the first service, and the first QoS flow of the first terminal device is a QoS flow used by the first terminal device to receive the data of the first service. For an association relationship between identifiers of first QoS flows of a group of terminal devices and the identifier of the common QoS flow, refer to Table 2. Each row indicates an association relationship between an identifier of a first QoS flow of a terminal device and the identifier of the common QoS flow.

TABLE 2

Association relationship between the identifiers of the first QoS flows of the group of terminal devices and the identifier of the common QoS flow

| Identifier of a terminal device | Identifier of a first QoS flow of the terminal device | Identifier of the common QoS flow |
|---|---|---|
| UE 1 | QFI_1-1 | QFI-C1 |
| UE 2 | QFI_1-2 | QFI-C1 |
| UE 3 | QFI_1-3 | QFI-C1 |
| ... | ... | ... |

As shown in Table 2, UE 1, UE 2, and UE 3 are identifiers of terminal devices. QFI_1-1 is an identifier of a first QoS flow of the terminal device corresponding to UE 1, QFI_1-2 is an identifier of a first QoS flow of the terminal device corresponding to UE 2, and QFI_1-3 is an identifier of a first QoS flow of the terminal device corresponding to UE 3. QFI-C1 is the identifier of the common QoS flow used to transmit the data of the first service. For the association relationship between the identifier of the first QoS flow of the terminal device and the identifier of the common QoS flow, refer to Table 3. As shown in Table 3, the identifier QFI-C1 of the common QoS flow corresponds to the identifiers QFI_1-1, QFI_1-2, and QFI_1-3 of the first QoS flows of the three terminal devices. Optionally, the association relationship between the first terminal device and the data of the first service may further include tunnel identification information corresponding to the first QoS flow of the first terminal device and/or tunnel identification information corresponding to the common QoS flow. The tunnel identification information may be core network side tunnel information and/or access network side tunnel information. Optionally, the association relationship between the first terminal device and the data of the first service may further include session identification information corresponding to the first QoS flow of the first terminal device and/or session identification information corresponding to the common QoS flow.

TABLE 3

Association relationship between the identifiers of the first QoS flows of the group of terminal devices and the identifier of the common QoS flow

| Identifier of the common QoS flow | Identifier of the first QoS flow of the terminal device |
|---|---|
| QFI-C1 | QFI_1-1 |
|  | QFI_1-2 |
|  | QFI_1-3 |
| ... | ... |

The association relationship between the first terminal device and the data of the first service may include an association relationship between the identifier of the first QoS flow of the first terminal device and an identifier of a first QoS flow of a second terminal device, where the first QoS flow of the first terminal device is the QoS flow used by the first terminal device to receive the data of the first service, the first QoS flow of the second terminal device is used to transmit the data of the first service, and the second terminal device is any terminal device, other than the first terminal device, in the group of terminal devices. For the association relationship between the identifier of the first QoS flow of the first terminal device and the identifier of the first QoS flow of the second terminal device, refer to Table 4 and Table 5. As shown in Table 4, UE 1, UE 2, and UE 3 are identifiers of terminal devices. QFI_1-1 is an identifier of a first QoS flow of the terminal device corresponding to UE 1, QFI_1-2 is an identifier of a first QoS flow of the terminal device corresponding to UE 2, and QFI_1-3 is an identifier of a first QoS flow of the terminal device corresponding to UE 3. It can be learned that, there is an association relationship between the identifier QFI_1-2 of the first QoS flow of the terminal device corresponding to UE 2 and the identifier QFI_1-1 of the first QoS flow of the terminal device corresponding to UE 1 or the identifier QFI_1-3 of the first QoS flow of the terminal device corresponding to UE 3. As shown in Table 5, there is the association relationship between the QoS flow identifier QFI_1-2 of the terminal device corresponding to UE 2 and the QoS flow identifier QFI_1-1 of the terminal device corresponding to UE 1 or the QoS flow identifier QFI_1-3 of the terminal device corresponding to UE 3. Optionally, the association relationship between the first terminal device and the data of the first service may further include the tunnel identification information corresponding to the first QoS flow of the first terminal device, and/or tunnel identification information corresponding to the first QoS flow of the second terminal device. The tunnel identification information may be the core network side tunnel information and/or the access network side tunnel information. Optionally, the association relationship between the first terminal device and the data of the first service may further include the session identification information corresponding to the first QoS flow of the first terminal device, and/or session identification information corresponding to the first QoS flow of the second terminal device.

TABLE 4

Association relationship between identifiers
of first QoS flows of terminal devices

| Identifier of a terminal device | Identifier of a first QoS flow of the terminal device |
|---|---|
| UE 1 | QFI_1-1 QFI_1-2 |
| UE 2 | QFI_1-2 QFI_1-2 (optional) |
| UE 3 | QFI_1-3 QFI_1-2 |
| . . . | . . . |

TABLE 5

Association relationship between the identifiers
of the first QoS flows of the terminal devices

| Identifier of the first QoS flow of the second terminal device | Identifiers of first QoS flows of other terminal devices |
|---|---|
| QFI_1-2 | QFI_1-1 QFI_1-2 (optional) QFI_1-3 |
| . . . | . . . |

The association relationship between the first terminal device and the data of the first service may include an association relationship between the identifier of the first QoS flow of the first terminal device and index information of the data of the first service. The first QoS flow of the first terminal device may be used by the first terminal device to receive the data of the first service. The index information of the data of the first service is used to indicate that transmitted data is the data of the first service or data of the same type. The index information of the data of the first service may be an index value, a content identifier, a reference value, or a group identifier of the data of the first service. Index information of a same type or format should be used for different services. The association relationship between the identifier of the first QoS flow of the first terminal device and the index information of the data of the first service is described by using an example of the index value of the data of the first service. For details, refer to Table 6 and Table 7. As shown in Table 6, UE 1, UE 2, and UE 3 are identifiers of terminal devices. QFI_1-1 is an identifier of a first QoS flow of the terminal device corresponding to UE 1. Index 1 is the index value of the data of the first service. QFI_1-2 is an identifier of a first QoS flow of the terminal device corresponding to UE 2. QFI_1-3 is an identifier of a QoS flow of the terminal device corresponding to UE 3. As shown in Table 7, the index value Index 1 of the data of the first service corresponds to the identifier QFI_1-1 of the first QoS flow of the terminal device corresponding to UE 1, the identifier QFI_1-2 of the first QoS flow of the terminal device corresponding to UE 2, and the identifier QFI_1-3 of the first QoS flow of the terminal device corresponding to UE 3. Optionally, the association relationship between the first terminal device and the data of the first service may further include the tunnel identification information corresponding to the first QoS flow of the first terminal device, where the tunnel identification information may be the core network side tunnel information and/or the access network side tunnel information. Optionally, the association relationship between the first terminal device and the data of the first service may further include the first terminal device and session identification information corresponding to the first service.

TABLE 6

Association relationship between the identifier of
the first QoS flow of the terminal device and the
index information of the data of the first service

| Identifier of a terminal device | Identifier of a first QoS flow of the terminal device + Index value of the data of the first service |
|---|---|
| UE 1 | QFI_1-1 Index 1 |
| UE 2 | QFI_1-2 Index 1 |
| UE 3 | QFI_1-3 Index 1 |
| . . . | . . . |

TABLE 7

Association relationship between the identifier
of the QoS flow of the terminal device and the
index information of the data of the first service

| Index value of the data of the first service | Identifier of a QoS flow of the terminal device |
|---|---|
| Index 1 | QFI_1-1 QFI_1-2 (optional) QFI_1-3 |
| . . . | . . . |

The access network device may obtain, from the core network device, the association relationship between the first terminal device and the data of the first service, and may further generate, based on the association relationship between the first terminal device and the data of the first service, the association relationship that is between the group of terminal devices and the data of the first service and that is used by the access network device to schedule the data packet of the first service. Alternatively, the access network device may directly obtain, from the core network device, the association relationship between the group of terminal devices and the data of the first service. For specific content, refer to Table 2 to Table 7.

In an implementation, the association relationship between the first terminal device and the data of the first service may include an association relationship between an identifier of a second QoS flow of the first terminal device and an identifier of a second QoS flow of at least one other terminal device in the group of terminal devices. The second QoS flow of the at least one other terminal device in the group of terminal devices is used to receive the data of the first service, and the second QoS flow of the first terminal device may be used by the first terminal device to receive the data of the first service. For the association relationship between the identifier of the second QoS flow of the first terminal device and the identifier of the second QoS flow of the at least one other terminal device in the group of terminal devices, refer to Table 8 to Table 11. As shown in Table 8, UE 1 is an identifier of the first terminal device, and QFI_2-1 is the identifier of the second QoS flow of the first terminal device. As shown in Table 9, UE 2 is an identifier of a second terminal device, and there is an association relationship between an identifier QFI_2-2 of a second QoS flow of the second terminal device and the identifier QFI_2-1 of the second QoS flow of the first terminal device. As shown in Table 10, UE 3 is an identifier of a third terminal device, and there is an association relationship between an identifier QFI_2-3 of a second QoS flow of the third terminal device, the identifier QFI_2-1 of the second QoS flow of the first terminal device, and the identifier QFI_2-2 of the second QoS flow of the second terminal device. As shown in Table 11, UE 4 is an identifier of a fourth terminal device, and there is an association relationship between an identifier QFI_2-4 of a second QoS flow of the fourth terminal device, the identifier QFI_2-1 of the second QoS flow of the first terminal device, the identifier QFI_2-2 of the second QoS flow of the second terminal device, and the identifier QFI_2-3 of the second QoS flow of the third terminal device. The first terminal device, the second terminal device, the third terminal device, and the fourth terminal device are terminal devices in the group of terminal devices. Optionally, the association relationship between the identifier of the second QoS flow of the first terminal device and the identifier of the second QoS flow of the at least one other terminal device in the group of terminal devices may further include tunnel identification information corresponding to the second QoS flow of the first terminal, and/or tunnel identification information corresponding to the second QoS flow of the at least one other terminal device in the group of terminal devices. The tunnel identification information may be the core network side tunnel information and/or the access network side tunnel information. Optionally, the association relationship between the identifier of the second QoS flow of the first terminal device and the identifier of the second QoS flow of the at least one other terminal device in the group of terminal devices may further include the first terminal device and the session identification information corresponding to the first service.

TABLE 8

Identifier of the second QoS flow of the first terminal device

| Identifier of the first terminal device | Identifier of the second QoS flow of the first terminal device |
| --- | --- |
| UE 1 | QFI_2-1 |

TABLE 9

Association relationship between the identifiers of the second QoS flows of the first terminal device and the second terminal device

| Identifier of the second terminal device | Identifiers of the second QoS flows of the first terminal device and the second terminal device |
| --- | --- |
| UE 2 | QFI_2-2 QFI_2-1 |

TABLE 10

Association relationship between the identifiers of the second QoS flows of the first terminal device, the second terminal device, and the third terminal device

| Identifier of the third terminal device | Identifiers of the second QoS flows of the first terminal device, the second terminal device, and the third terminal device |
| --- | --- |
| UE 3 | QFI_2-3, QFI_2-2, and QFI_2-1 |

TABLE 11

Association relationship between the identifiers of the second QoS flows of the first terminal device, the second terminal device, the third terminal device, and the fourth terminal device

| Identifier of the fourth terminal device | Identifiers of the second QoS flows of the first terminal device, the second terminal device, the third terminal device, and the fourth terminal device |
| --- | --- |
| UE 4 | QFI_2-4 QFI_2-3 QFI_2-2 QFI_2-1 |

The association relationship between the first terminal device and the data of the first service may be carried in N2 session management information sent by an SMF network element to the access network device by using an AMF network element, or may be placed in a message or container sent by another SMF to the access network device.

1602: The access network device sets up a first radio bearer to the first terminal device.

After the access network device receives, from the core network device, the association relationship between the first terminal device and the data of the first service, it is indicated that the data of the first service that needs to be transmitted exists between the access network device and the first terminal device, and the first radio bearer to the first terminal device may be set up. For specific descriptions, refer to step 902. The association relationship between the first terminal device and the data of the first service may be sent by the core network device by using a PDU session resource setup request.

1603: The access network device associates the first radio bearer with the QoS flow used to transmit the data of the first service.

After setting up the first radio bearer to the first terminal device, the access network device may determine, based on the association relationship obtained from the core network, that the data of the first service that is received from the QoS flow used to transmit the data of the first service needs to be transmitted on the first radio bearer. The QoS flow used to transmit the data of the first service transmits the data of the first service. The QoS flow used to transmit the data of the first service may be the common QoS flow or the first QoS flow of the second terminal device in step 1601. When the association information includes the index information corresponding to the data of the first service, the access network device may select one of the first QoS flows of the group of terminal devices for transmission. Step 1603 is an optional step.

1604: The access network device sends a first RNTI to the first terminal device.

For detailed descriptions, refer to step 904. Details are not described herein again.

1605: The access network device sends a second RNTI to the first terminal device.

The access network device sends the second RNTI to the first terminal device based on the association relationship. For detailed descriptions, refer to step 905. Details are not described herein again.

1606. The access network device sends configuration information to the first terminal device.

For detailed descriptions, refer to step 906. Details are not described herein again.

1607: The access network device schedules the data packet of the first service for the first terminal device on the first radio bearer by using the first RNTI and the second RNTI.

For detailed descriptions, refer to step 907. Details are not described herein again.

Figure 17:
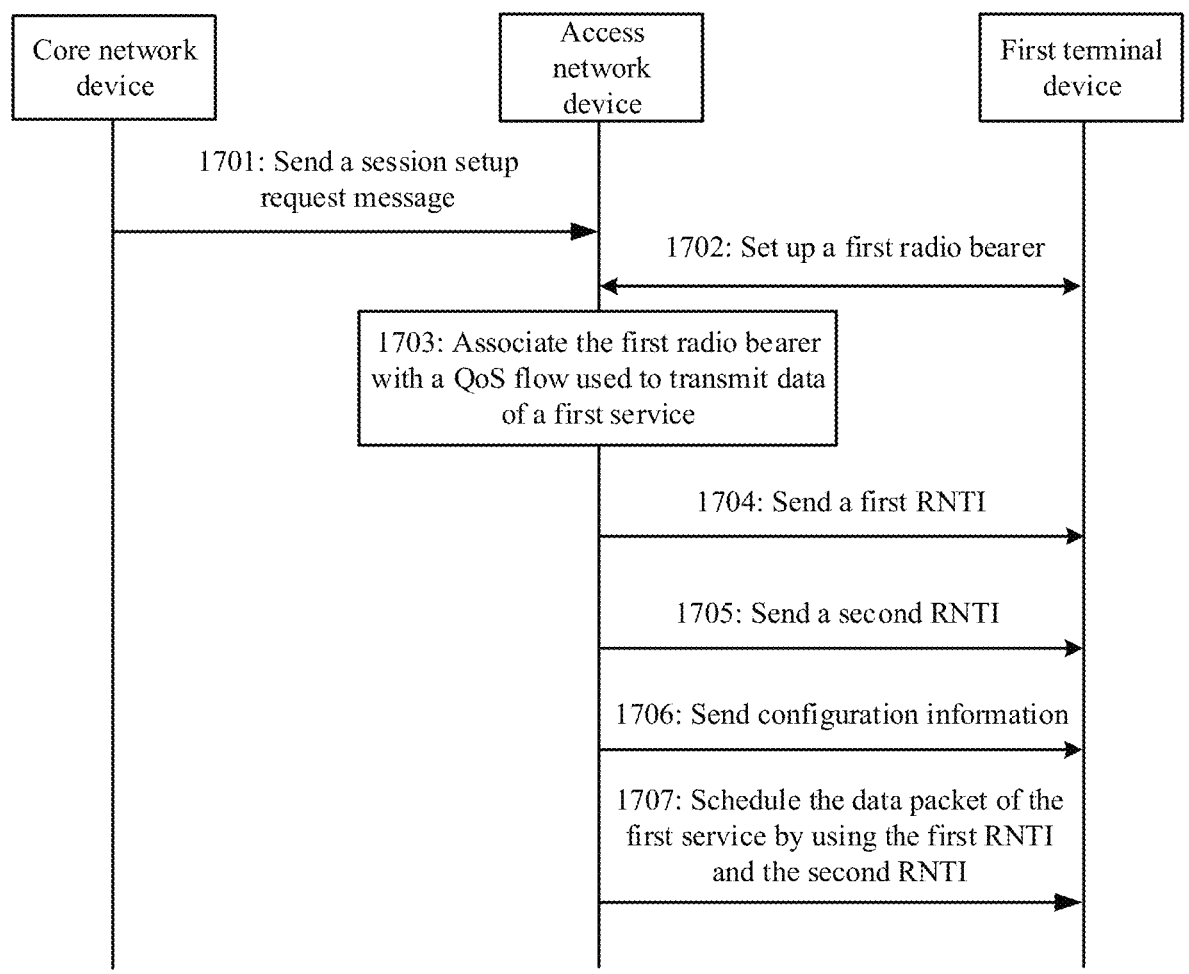
FIG. 17 is a schematic flowchart of still another communication method according to an embodiment of the present invention.

Based on the network architecture shown in FIG. 1, FIG. 17 is a schematic flowchart of still another communication method according to an embodiment of the present invention. As shown in FIG. 17, the communication method may include the following steps.

1701: A core network device sends, to an access network device, a session setup request message used to set up a first QoS flow of a first terminal.

When there is data that is of the first service and that needs to be transmitted, the core network device may send, to the access network device, the session setup request message used to set up the first QoS flow of the first terminal. The session setup request message may be carried in a message such as an initial context setup message, a PDU session setup message, or a context modification message. The session setup request message may indicate that the first QoS flow of the first terminal device carries data of a multicast service.

In a case, the session setup request message may carry indication information used to indicate that the first QoS flow of the first terminal device carries the data of the multicast service. To be specific, when the session setup request message carries the indication information used to indicate that the first QoS flow of the first terminal device carries the data of the multicast service, the session setup request message is used for setting up the first QoS flow carrying the data of the multicast service. When the session setup request message does not carry the indication information used to indicate that the first QoS flow of the first terminal device carries the data of the multicast service, the session setup request message is used for setting up a first QoS flow carrying data of a unicast service.

In another case, the session setup request message may directly indicate that the first QoS flow of the first terminal device carries the data of the multicast service. To be specific, when the session setup request message indicates that the first QoS flow of the first terminal device carries the data of the multicast service, the session setup request message is used for setting up the first QoS flow carrying the data of the multicast service. When the session setup request message does not indicate that the first QoS flow carries the data of the multicast service, the session setup request message is used for setting up a first QoS flow carrying data of a unicast service.

Optionally, before sending, to the access network device, the session setup request message used to set up the first QoS flow of the first terminal device, the core network device may receive, from the first terminal device, a session setup request that is used for setting up the first QoS flow receiving the data of the first service.

Optionally, the session setup request message may further carry address information for receiving the data of the first service by the access network device, for example, an IP address of the access network device, tunnel identification information of the access network device, N3 tunnel identification information of one of a group of terminal devices, or common N3 tunnel identification information of the access network device. The address information is used by the access network device to set up the first QoS flow of the first terminal device for the first terminal device. For other detailed descriptions, refer to step 901.

1702: The access network device sets up a first radio bearer to the first terminal device.

After the access network device receives the session setup request message that is from the core network device and that is used to set up the first QoS flow of the first terminal device, it is indicated that data that needs to be transmitted between the access network device and the first terminal device is the data of the multicast service, the data of the multicast service is the data of the first service, and the first radio bearer to the first terminal device may be set up. For specific descriptions, refer to step 902.

Because the data of the multicast service is transmitted, and the data of the multicast service may be scheduled for a plurality of terminal devices by using a G-RNTI, encryption may not be performed on the first radio bearer set up by the access network device for the first terminal device. Because different terminal devices use different keys for encryption, once the multicast data is encrypted, after the data of the multicast service is scheduled for the plurality of terminal devices, only one of the plurality of terminal devices can correctly decrypt the multicast data, and other terminal devices cannot decrypt the multicast data. Consequently, multicast transmission of the data of the multicast service cannot be implemented.

1703: The access network device associates the first radio bearer with the first QoS flow used to transmit the data of the first service.

After setting up the first radio bearer to the first terminal device, the access network device may associate the first radio bearer with the first QoS flow used to transmit the data of the first service, so that data overheads for transmitting the first service between the core network device and the access network device can be reduced. When the plurality of terminal devices all receive the data of the first service, one N3 QoS flow is used, so that the plurality of terminal devices do not repeatedly send the data of the first service to the same access network device. The N3 QoS flow may be a common QoS flow, or may be a first QoS flow of one of the group of terminal devices. The first QoS flow used to transmit the data of the first service may be the common QoS flow or the first QoS flow of the second terminal device described in step 1601. When association information includes index information corresponding to the data of the first service, the access network device may select one of first QoS flows of the group of terminal devices for transmission. If this step is not performed, a dedicated data channel may still be set up between the access network device and the core network device. In this way, when the terminal devices receive the data of the first service, for all the terminal devices, there are different dedicated data channels that are between the access network device and the core network device and that are related to the terminal devices. The data of the first service may be sent to the access network device on the dedicated channels. Step 1703 is an optional step.

1704: The access network device sends a first RNTI to the first terminal device.

For detailed descriptions, refer to step 904. Details are not described herein again.

1705: The access network device sends a second RNTI to the first terminal device.

The access network device sends the second RNTI to the first terminal device based on the association relationship. For detailed descriptions, refer to step 905. Details are not described herein again.

1706. The access network device sends configuration information to the first terminal device.

For detailed descriptions, refer to step 906. Details are not described herein again.

1707: The access network device schedules the data packet of the first service for the first terminal device on the first radio bearer by using the first RNTI and the second RNTI.

For detailed descriptions, refer to step 907. Details are not described herein again.

Figure 12:
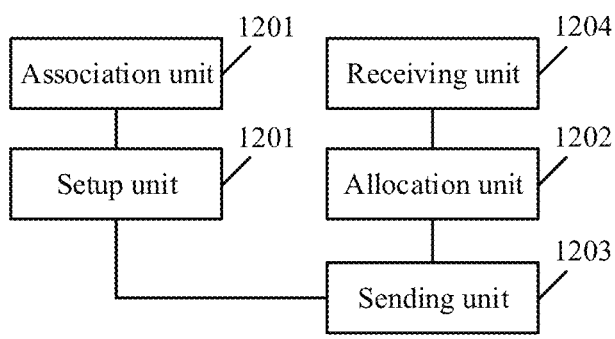
FIG. 12 is a schematic diagram of a structure of a communication apparatus according to an embodiment of the present invention.

Based on the network architecture shown in FIG. 1, FIG. 12 is a schematic diagram of a structure of a communication apparatus according to an embodiment of the present invention. The communication apparatus may be an access network device or a chip in the access network device. As shown in FIG. 12, the communication apparatus may include:

a setup unit 1201, configured to set up a first radio bearer for a first terminal device, where the first radio bearer is used to transmit a first service;

an allocation unit 1202, configured to allocate a first RNTI and a second RNTI to the first terminal device, where the first RNTI is used to schedule a service for the first terminal device, and the second RNTI is used to schedule the first service for a group of terminal devices including the first terminal device; and a sending unit 1203, configured to schedule a data packet of the first service for the first terminal device on the first radio bearer by using the first RNTI and the second RNTI.

In an embodiment, the communication apparatus may further include:

a receiving unit 1204, configured to receive a service setup request message from a core network device, where the service setup request message carries common information used to indicate that the first service is a multicast service.

In an embodiment, the common information is service information or address information of the multicast service.

In an embodiment, the communication apparatus may further include:

an association unit 1205, configured to associate the first radio bearer with a first common data channel, where the first common data channel is used to transmit the data of the first service with the core network device.

In an embodiment, the sending unit 1203 is specifically configured to:

schedule the data packet of the first service for the first terminal device on the first radio bearer by using the second RNTI;

receive feedback information that is from the first terminal device and that is used to indicate that the data packet of the first service fails to be transmitted; and retransmit the data packet of the first service to the first terminal device on the first radio bearer by using the first RNTI.

In an embodiment, the sending unit 1203 is further configured to send an association relationship between a first process and a second process to the first terminal device, where the first process is a process used to initially transmit the data packet of the first service, and the second process is a process used to retransmit the data packet of the first service.

In an embodiment, the sending unit 1203 is further configured to send indication information to the first terminal device, where the indication information is used to indicate that the second RNTI is used for scheduling the first service.

In an embodiment, the data packet of the first service includes a logical channel identifier, and the logical channel identifier is used to indicate that a data packet transmitted by using the second RNTI is the data packet of the first service.

In an embodiment, the sending unit 1203 is further configured to send first configuration information to the first terminal device, where the first configuration information is used to indicate the first terminal device to detect the second RNTI based on the first configuration information.

In an embodiment, the first configuration information includes one or more of the following:

BWP information corresponding to the second RNTI;

CORESET information corresponding to the second RNTI; and search space information corresponding to the second RNTI.

In an embodiment, the sending unit 1203 is further configured to send, to a resource management module, indication information used to indicate a quantity of the terminal devices receiving the first service and/or configuration information of an RNTI used for the first service;

the receiving unit 1204 is further configured to receive, from the resource management module, second configuration information corresponding to the first service, where the second configuration information includes configuration information of the second RNTI; and the sending unit 1203 is further configured to send the second configuration information to the first terminal device.

For more detailed descriptions of the setup unit 1201, the allocation unit 1202, the sending unit 1203, the receiving unit 1204, and the association unit 1205, directly refer to related descriptions of the access network device in the foregoing method embodiments. Details are not described herein.

Figure 13:
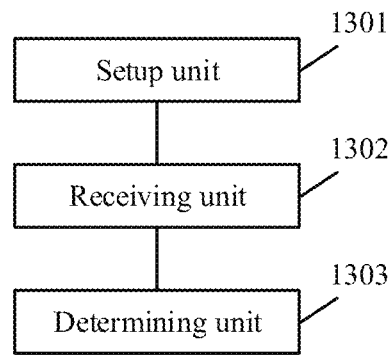
FIG. 13 is a schematic diagram of a structure of another communication apparatus according to an embodiment of the present invention.

Based on the network architecture shown in FIG. 1, FIG. 13 is a schematic diagram of a structure of another communication apparatus according to an embodiment of the present invention. The communication apparatus may be a terminal device or a chip in the terminal device. As shown in FIG. 13, the communication apparatus may include:

a setup unit 1301, configured to set up a first radio bearer to an access network device, where the first radio bearer is used to transmit a first service; and a receiving unit 1302, configured to receive a first RNTI and a second RNTI from the access network device, where the first RNTI is used to receive a service scheduled by the access network device for a terminal device, and the second RNTI is used to receive the first service scheduled by the access network device for a group of terminal devices including the terminal device, where the receiving unit 1302 is further configured to receive, on the first radio bearer by using the first RNTI and the second RNTI, a data packet that is of the first service and that is scheduled by the access network device.

In an embodiment, that the receiving unit 1302 receives, on the first radio bearer by using the first RNTI and the second RNTI, the data packet that is of the first service and that is scheduled by the access network device includes:

receiving, on the first radio bearer by using the second RNTI, the data packet that is of the first service and that is scheduled by the access network device;

sending, to the access network device, feedback information used to indicate that the data packet of the first service fails to be transmitted; and receiving, on the first radio bearer by using the first RNTI, the data packet that is of the first service and that is retransmitted by the access network device.

In an embodiment, the receiving unit 1302 is further configured to receive an association relationship between a first process and a second process from the access network device, where the first process is a process used to initially transmit the data packet of the first service, and the second process is a process used to retransmit the data packet of the first service.

That the receiving unit 1302 receives, on the first radio bearer by using the first RNTI, the data packet that is of the first service and that is retransmitted by the access network device includes:

receiving, on the first radio bearer based on the association relationship by using the first RNTI, the data packet that is of the first service and that is retransmitted by the access network device.

In an embodiment, the communication apparatus may further include a determining unit 1303.

In a case, the receiving unit 1302 is further configured to receive first indication information from the access network device, and the determining unit 1303 is configured to determine, based on the first indication information, that the second RNTI is used for scheduling the first service.

In another case, the determining unit 1303 is configured to determine, based on a logical channel identifier included in the data packet of the first service, that a data packet transmitted by using the second RNTI is the data packet of the first service.

In an embodiment, the receiving unit 1302 is further configured to receive configuration information from the access network device; and that the receiving unit 1302 receives, on the first radio bearer by using the second RNTI, the data packet that is of the first service and that is scheduled by the access network device includes:

detecting, on the first radio bearer based on the second RNTI and the configuration information, the data packet that is of the first service and that is from the access network device.

In an embodiment, the configuration information includes one or more of the following:

BWP information corresponding to the second RNTI;
CORESET information corresponding to the second RNTI; and
search space information corresponding to the second RNTI.

In an embodiment, the receiving unit 1302 is further configured to receive second indication information from the access network device; and the determining unit 1303 is further configured to determine, based on the second indication information, that the first radio bearer is a radio bearer used to transmit the first service.

In an embodiment, that the receiving unit 1302 receives, on the first radio bearer by using the first RNTI and the second RNTI, the data packet that is of the first service and that is from the access network device includes:

receiving, by using the first RNTI, a first data packet that is of the first service and that is from the access network device;

receiving, by using the second RNTI, a second data packet that is of the first service and that is from the access network device; and combining the first data packet and the second data packet onto the first radio bearer.

In an embodiment, that the receiving unit 1302 combines the first data packet and the second data packet onto the first radio bearer includes:

when the first data packet and the second data packet are data packets at a MAC layer, combining, at an RLC layer, RLC PDUs included in the first data packet and the second data packet onto the first radio bearer; or when the first data packet and the second data packet are data packets at an RLC layer, combining, at a PDCP layer, PDCP PDUs included in the first data packet and the second data packet onto the first radio bearer.

In an embodiment, that the receiving unit 1302 combines, at the RLC layer, the RLC PDUs included in the first data packet and the second data packet onto the first radio bearer includes:

sorting and/or deduplicating the RLC PDU included in the first data packet and the RLC PDU included in the second data packet.

In an embodiment, that the receiving unit 1302 combines, at the RLC layer, the RLC PDUs included in the first data packet and the second data packet onto the first radio bearer includes:

sorting and/or deduplicating the RLC PDU included in the first data packet and the RLC PDU included in the second data packet.

For more detailed descriptions of the setup unit 1301, the receiving unit 1302, and the determining unit 1303, directly refer to related descriptions of the terminal device in the foregoing method embodiments. Details are not described herein.

Figure 14:
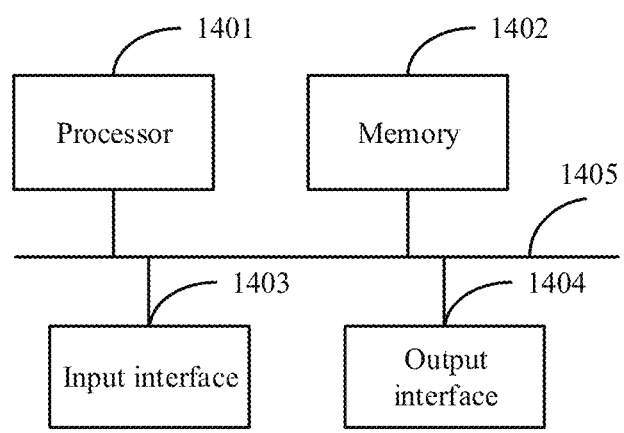
FIG. 14 is a schematic diagram of a structure of still another communication apparatus according to an embodiment of the present invention.

Based on the network architecture shown in FIG. 1, FIG. 14 is a schematic diagram of a structure of still another communication apparatus according to an embodiment of the present invention. As shown in FIG. 14, the communication apparatus may include a processor 1401, a memory 1402, an input interface 1403, an output interface 1404, and a bus 1405. The memory 1402 may exist independently, and be connected to the processor 1401 through the bus 1405. Alternatively, the memory 1402 may be integrated with the processor 1401. The bus 1405 is configured to implement connection between the components.

In an embodiment, the communication apparatus may be an access network device or a chip in the access network device.

The memory 1402 stores a group of computer programs, and the processor 1401 is configured to invoke the computer programs stored in the memory 1402 to perform the following operations:

setting up a first radio bearer for a first terminal device, where the first radio bearer is used to transmit a first service; and allocating a first RNTI and a second RNTI to the first terminal device, where the first RNTI is used to schedule a service for the first terminal device, and the second RNTI is used to schedule the first service for a group of terminal devices including the first terminal device.

The output interface 1404 is configured to schedule a data packet of the first service for the first terminal device on the first radio bearer by using the first RNTI and the second RNTI.

In an embodiment, the input interface 1403 is configured to receive a service setup request message from a core network device, where the service setup request message carries common information used to indicate that the first service is a multicast service.

In a embodiment, the common information is service information or address information of the multicast service.

In an embodiment, the processor 1401 is further configured to invoke the computer programs stored in the memory 1402 to perform the following operation:

associating the first radio bearer with a first common data channel, where the first common data channel is used to transmit the data of the first service with the core network device.

In an embodiment, that the output interface 1404 schedules the data packet of the first service for the first terminal device on the first radio bearer by using the first RNTI and the second RNTI includes:

the output interface 1404 schedules the data packet of the first service for the first terminal device on the first radio bearer by using the second RNTI;

the input interface 1403 receives feedback information that is from the first terminal device and that is used to indicate that the data packet of the first service fails to be transmitted; and the output interface 1404 retransmits the data packet of the first service to the first terminal device on the first radio bearer by using the first RNTI.

In an embodiment, the output interface 1404 is further configured to send an association relationship between a first process and a second process to the first terminal device, where the first process is a process used to initially transmit the data packet of the first service, and the second process is a process used to retransmit the data packet of the first service.

In an embodiment, the output interface 1404 is further configured to send indication information to the first terminal device, where the indication information is used to indicate that the second RNTI is used for scheduling the first service.

In an embodiment, the data packet of the first service includes a logical channel identifier, and the logical channel identifier is used to indicate that a data packet transmitted by using the second RNTI is the data packet of the first service.

In an embodiment, the output interface 1404 is further configured to send first configuration information to the first terminal device, where the first configuration information is used to indicate the first terminal device to detect the second RNTI based on the first configuration information.

In an embodiment, the first configuration information includes one or more of the following:

BWP information corresponding to the second RNTI;

CORESET information corresponding to the second RNTI; and search space information corresponding to the second RNTI.

In an embodiment, the output interface 1404 is further configured to send, to a resource management module, indication information used to indicate a quantity of the terminal devices receiving the first service and/or configuration information of an RNTI used for the first service;

the input interface 1403 is further configured to receive, from the resource management module, second configuration information corresponding to the first service, where the second configuration information includes configuration information of the second RNTI; and the output interface 1404 is further configured to send the second configuration information to the first terminal device.

Step 401, step 902 and step 903, and step 1104 and step 1105 may be performed by the processor 1401 and the memory 1402 in the access network device. The step of receiving the service setup request message in step 901 and step 1103, and the step of receiving the second configuration information in step 1102 may be performed by using the input interface 1403 in the access network device. Step 402 to step 404, step 904 to step 907, and step 1106 to step 1109 may be performed by the output interface 1404 in the access network device.

The setup unit 1201, the allocation unit 1202, and the association unit 1205 may be implemented by the processor 1401 and the memory 1402 in the access network device. The receiving unit 1204 may be implemented by using the input interface 1403 in the access network device. The sending unit 1203 may be implemented by using the output interface 1404 in the access network device.

The access network device may be further configured to perform various methods performed by the access network device in the foregoing method embodiments. Details are not described again.

In another embodiment, the communication apparatus may be a terminal device or a chip in the terminal device.

The memory 1402 stores a group of computer programs, and the processor 1401 is configured to invoke the computer programs stored in the memory 1402 to perform the following operation:

setting up a first radio bearer to an access network device, where the first radio bearer is used to transmit a first service.

The input interface 1403 is configured to receive a first RNTI and a second RNTI from the access network device, where the first RNTI is used to receive a service scheduled by the access network device for a terminal device, and the second RNTI is used to receive the first service scheduled by the access network device for a group of terminal devices including the terminal device, where the input interface 1403 is further configured to receive, on the first radio bearer by using the first RNTI and the second RNTI, a data packet that is of the first service and that is scheduled by the access network device.

In an embodiment, that the input interface 1403 receives, on the first radio bearer by using the first RNTI and the second RNTI, the data packet that is of the first service and that is scheduled by the access network device includes:

the input interface 1403 receives, on the first radio bearer by using the second RNTI, the data packet that is of the first service and that is scheduled by the access network device;

the output interface 1404 sends, to the access network device, feedback information used to indicate that the data packet of the first service fails to be transmitted; and the input interface 1403 receives, on the first radio bearer by using the first RNTI, the data packet that is of the first service and that is retransmitted by the access network device.

In an embodiment, the input interface 1403 is further configured to receive an association relationship between a first process and a second process from the access network device, where the first process is a process used to initially transmit the data packet of the first service, and the second process is a process used to retransmit the data packet of the first service.

That the input interface 1403 receives, on the first radio bearer by using the first RNTI, the data packet that is of the first service and that is retransmitted by the access network device includes:

receiving, on the first radio bearer based on the association relationship by using the first RNTI, the data packet that is of the first service and that is retransmitted by the access network device.

In an embodiment, the input interface 1403 is further configured to receive first indication information from the access network device; and the processor 1401 is further configured to invoke the computer programs stored in the memory 1402 to perform the following operation:

determining, based on the first indication information, that the second RNTI is used for scheduling the first service.

In an embodiment, the processor 1401 is further configured to invoke the computer programs stored in the memory 1402 to perform the following operation:

determining, based on a logical channel identifier included in the data packet of the first service, that a data packet transmitted by using the second RNTI is the data packet of the first service.

In an embodiment, the input interface 1403 is further configured to receive configuration information from the access network device; and that the input interface 1403 receives, on the first radio bearer by using the second RNTI, the data packet that is of the first service and that is scheduled by the access network device includes:

detecting, on the first radio bearer based on the second RNTI and the configuration information, the data packet that is of the first service and that is from the access network device.

In an embodiment, the configuration information includes one or more of the following:

BWP information corresponding to the second RNTI;
CORESET information corresponding to the second RNTI; and
search space information corresponding to the second RNTI.

In an embodiment, the input interface 1403 is further configured to receive second indication information from the access network device; and the processor 1401 is further configured to invoke the computer programs stored in the memory 1402 to perform the following operation:

determining, based on the second indication information, that the first radio bearer is a radio bearer used to transmit the first service.

In an embodiment, that the input interface 1403 receives, on the first radio bearer by using the first RNTI and the second RNTI, the data packet that is of the first service and that is from the access network device includes:

the input interface 1403 receives, by using the first RNTI, a first data packet that is of the first service and that is from the access network device;

the input interface 1403 receives, by using the second RNTI, a second data packet that is of the first service and that is from the access network device; and the processor 1401 combines the first data packet and the second data packet onto the first radio bearer.

In an embodiment, that the processor 1401 combines the first data packet and the second data packet onto the first radio bearer includes:

when the first data packet and the second data packet are data packets at a MAC layer, combining, at an RLC layer, RLC PDUs included in the first data packet and the second data packet onto the first radio bearer; or when the first data packet and the second data packet are data packets at an RLC layer, combining, at a PDCP layer, PDCP PDUs included in the first data packet and the second data packet onto the first radio bearer.

In an embodiment, that the processor 1401 combines, at the RLC layer, the RLC PDUs included in the first data packet and the second data packet onto the first radio bearer includes:

sorting and/or deduplicating the RLC PDU included in the first data packet and the RLC PDU included in the second data packet.

In an embodiment, that the processor 1401 combines, at the PDCP layer, the PDCP PDUs included in the first data packet and the second data packet onto the first radio bearer includes:

sorting and/or deduplicating the PDCP PDU included in the first data and the PDCP PDU included in the second data packet.

The step of receiving the first RNTI in step 402, step 904, and step 1106, the step of receiving the second RNTI in step 403, step 905, and step 1107, the step of receiving the data packet of the first service in step 404, step 907, and step 1109, and the step of receiving the configuration information in step 906 and step 1108 may be performed by using the input interface 1303 in the terminal device.

The setup unit 1301 and the determining unit 1303 may be implemented by the processor 1401 and the memory 1402 in the terminal device, and the receiving unit 1302 may be implemented by the input interface 1403 in the terminal device.

The terminal device may be further configured to perform various methods performed by the terminal device in the foregoing method embodiments. Details are not described again.

Figure 15:
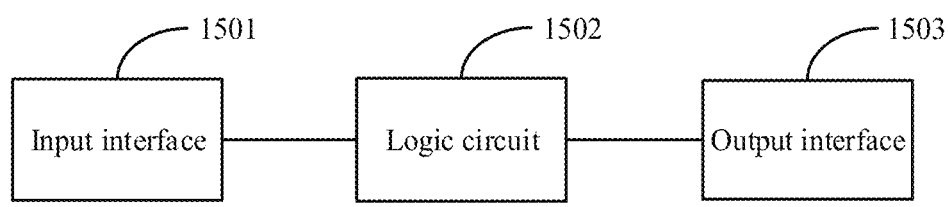
FIG. 15 is a schematic diagram of a structure of still another communication apparatus according to an embodiment of the present invention.

Based on the network architecture shown in FIG. 1, FIG. 15 is a schematic diagram of a structure of still another communication apparatus according to an embodiment of the present invention. As shown in FIG. 15, the communication apparatus may include an input interface 1501, a logic circuit 1502, and an output interface 1503. The input interface 1501 is connected to the output interface 1503 through the logic circuit 1502. The input interface 1501 is configured to receive information from another communication apparatus, and the output interface 1503 is configured to output, schedule, or send information to another communication apparatus. The logic circuit 1502 is configured to perform operations other than operations of the input interface 1501 and the output interface 1503, for example, implement functions implemented by the processor 1401 in the foregoing embodiment. The communication apparatus may be an access network device or a chip in the access network device, or may be a terminal device or a chip in the terminal device. For more detailed descriptions of the input interface 1501, the logic circuit 1502, and the output interface 1503, directly refer to related descriptions of the access network device or the terminal device in the method embodiments shown in FIG. 4, FIG. 9, and FIG. 11. Details are not described herein.

An embodiment of the present invention further discloses a computer-readable storage medium. The computer-readable storage medium stores a computer program. When the computer program runs, the communication methods shown in FIG. 4, FIG. 9, and FIG. 11 are implemented.

The objectives, the technical solutions, and the benefits of this application are further described in detail in the foregoing specific implementations. It should be understood that the foregoing descriptions are merely specific implementations of this application, but are not intended to limit the protection scope of this application. Any modification, equivalent replacement, or improvement made based on the technical solutions of this application shall fall within the protection scope of this application.

What is claimed is:

1. A communication method, comprising:
    receiving, from a core network device, an association relationship between a plurality of identifiers of first QoS flows of a plurality of terminal devices and an identifier of a common QoS flow, where the common QoS flow is a QoS flow used to transmit data of a first service, and each of the first QoS flows of the plurality of terminal devices is a QoS flow used by each of the plurality of terminal devices to receive the data of the first service;
    based on the association relationship, setting up a first radio bearer for a first terminal device, wherein the first radio bearer is used to transmit the first service;
    allocating a first radio network temporary identifier (RNTI) and a second RNTI to the first terminal device, wherein the first RNTI is used to schedule a service for the first terminal device, and the second RNTI is used to schedule the first service for a group of terminal devices comprising the first terminal device, and wherein the first RNTI is a group RNTI and the second RNTI is a unicast RNTI; and
    scheduling a data packet of the first service for the first terminal device on the first radio bearer by using the first RNTI and the second RNTI, wherein the data packet comprises a logical channel identifier, and the logical channel identifier indicates that the data packet transmitted by using the second RNTI is the data packet of a multicast service.

2. The method according to claim 1, wherein the method further comprises:
    receiving a service setup request message from a core network device, wherein the service setup request message carries common information indicating that the first service is a multicast service.

3. The method according to claim 2, wherein the common information is service information or address information of the multicast service.

4. The method according to claim 2, wherein the method further comprises:
    associating the first radio bearer with a first common data channel, wherein the first common data channel is used to transmit the data of the first service with the core network device.

5. The method according to claim 1, wherein the scheduling a data packet of the first service for the first terminal device on the first radio bearer by using the first RNTI and the second RNTI comprises:
    scheduling the data packet of the first service for the first terminal device on the first radio bearer by using the second RNTI;
    receiving feedback information that is from the first terminal device and that indicates that the data packet fails to be transmitted; and
    retransmitting the data packet of the first service to the first terminal device on the first radio bearer by using the first RNTI.

6. The method according to claim 5, wherein the method further comprises:
    sending an association relationship between a first process and a second process to the first terminal device, wherein the first process is a process used to initially transmit the data packet, and the second process is a process used to retransmit the data packet.

7. The method according to claim 1, wherein the method further comprises:
    sending indication information to the first terminal device, wherein the indication information indicates that the second RNTI is used for scheduling the first service.

8. The method according to claim 1, wherein the method further comprises:
    sending first configuration information to the first terminal device, wherein the first configuration information indicates the first terminal device to detect the second RNTI based on the first configuration information.

9. The method according to claim 8, wherein the first configuration information comprises at least one of the following:
    bandwidth part (BWP) information corresponding to the second RNTI;
    control resource set (CORESET) information corresponding to the second RNTI; or
    search space information corresponding to the second RNTI.

10. The method according to claim 1, wherein the method further comprises:
    sending indication information that indicates a quantity of the group of terminal devices receiving the first service or configuration information of an RNTI used for the first service;
    receiving second configuration information corresponding to the first service, wherein the second configuration information comprises configuration information of the second RNTI; and
    sending the second configuration information to the first terminal device.

11. A communication apparatus, comprising:
    at least one processor; and
    one or more memories coupled to the at least one processor and storing programming instructions for execution by the at least one processor to cause the apparatus to:
    receive, from a core network device, an association relationship between a plurality of identifiers of first QoS flows of a plurality of terminal devices and an identifier of a common QoS flow, where the common QoS flow is a QoS flow used to transmit the data of a first service, and each of the first QoS flows of the plurality of terminal devices is a QoS flow used by each of the plurality of terminal devices to receive the data of the first service;

based on the association relationship, set up a first radio bearer for a first terminal device, wherein the first radio bearer is used to transmit a first service;

allocate a first radio network temporary identifier (RNTI) and a second RNTI to the first terminal device, wherein the first RNTI is used to schedule a service for the first terminal device, and the second RNTI is used to schedule the first service for a group of terminal devices comprising the first terminal device, and wherein the first RNTI is a group RNTI and the second RNTI is a unicast RNTI; and schedule a data packet of the first service for the first terminal device on the first radio bearer by using the first RNTI and the second RNTI, wherein the data packet comprises a logical channel identifier, and the logical channel identifier indicates that the data packet transmitted by using the second RNTI is the data packet of a multicast service.

12. The communication apparatus according to claim 11, wherein the programming instructions, when executed by the at least one processor, cause the apparatus to:

receive a service setup request message from a core network device, wherein the service setup request message carries common information indicating that the first service is a multicast service.

13. The communication apparatus according to claim 12, wherein the common information is service information or address information of the multicast service.

* * * * *